United States Patent
Sun et al.

(10) Patent No.: US 12,483,564 B2
(45) Date of Patent: *Nov. 25, 2025

(54) METHOD FOR PROVIDING RESTRICTED SERVICE, AND COMMUNICATIONS DEVICE

(71) Applicant: Huawei Technologies Co., Ltd., Shenzhen (CN)

(72) Inventors: Manli Sun, Shenzhen (CN); Zhenglei Huang, Shenzhen (CN); Yanmei Yang, Beijing (CN); Haiyang Sun, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 94 days.

This patent is subject to a terminal disclaimer.

(21) Appl. No.: 18/517,924

(22) Filed: Nov. 22, 2023

(65) Prior Publication Data

US 2024/0089299 A1    Mar. 14, 2024

Related U.S. Application Data

(63) Continuation of application No. 17/120,720, filed on Dec. 14, 2020, now Pat. No. 11,848,963, which is a
(Continued)

(30) Foreign Application Priority Data

Jun. 13, 2018   (CN) .......................... 201810627352.8

(51) Int. Cl.
*H04L 9/40* (2022.01)
*G16Y 30/10* (2020.01)
(Continued)

(52) U.S. Cl.
CPC .......... *H04L 63/1408* (2013.01); *G16Y 30/10* (2020.01); *G16Y 40/50* (2020.01);
(Continued)

(58) Field of Classification Search
CPC ..... H04L 63/20; H04L 47/20; H04L 63/1408; H04L 67/12; H04L 67/14; G16Y 30/10; G16Y 40/50
See application file for complete search history.

(56) References Cited

U.S. PATENT DOCUMENTS 11,848,963 B2 * 12/2023 Sun .................... H04L 63/1408
2006/0256012 A1   11/2006 Fok et al.
(Continued)

FOREIGN PATENT DOCUMENTS

CN   102457938 A   5/2012
CN   102868444 A   1/2013
(Continued)

OTHER PUBLICATIONS

China Mobile: "Solution for performance improvement and supervision of mIoT terminals," 3GPP Draft; S2-183604, Apr. 10, 2018, XP051437905, 3 pages.
(Continued)

*Primary Examiner* — Oleg Korsak
(74) *Attorney, Agent, or Firm* — Conley Rose, P.C.

(57) ABSTRACT

A method for providing a restricted service and a communications device, where the method includes: receiving, by a policy control function (PCF), an identifier of a terminal and indication information, where the indication information is used to indicate that the terminal is in a state of exception or indicate an exception type of the terminal; and sending, by the PCF, the identifier of the terminal and a first restricted service policy according to the indication information,
(Continued)

where the first restricted service policy is used to provide a restricted service for the terminal.

20 Claims, 19 Drawing Sheets

Related U.S. Application Data continuation of application No. PCT/CN2019/091145, filed on Jun. 13, 2019.

(51) Int. Cl.
- *G16Y 40/50* (2020.01)
- *H04L 47/20* (2022.01)
- *H04L 67/12* (2022.01)
- *H04L 67/14* (2022.01)
- *H04L 41/0894* (2022.01)

(52) U.S. Cl.
CPC .............. *H04L 47/20* (2013.01); *H04L 63/20* (2013.01); *H04L 67/12* (2013.01); *H04L 67/14* (2013.01); *H04L 41/0894* (2022.05)

(56) References Cited

U.S. PATENT DOCUMENTS

| | | |
|---|---|---|
| 2011/0225306 A1 | 9/2011 | Delsesto et al. |
| 2014/0059678 A1 | 2/2014 | Parker |
| 2016/0338073 A1 | 11/2016 | Nuggehalli et al. |
| 2017/0105155 A1 | 4/2017 | Zhao et al. |
| 2020/0214054 A1 | 7/2020 | Qiao et al. |
| 2021/0250890 A1 | 8/2021 | Won |

FOREIGN PATENT DOCUMENTS

| | | | |
|---|---|---|---|
| CN | 102882712 A | | 1/2013 |
| CN | 102893640 A | | 1/2013 |
| CN | 105163335 A | | 12/2015 |
| CN | 105187290 A | | 12/2015 |
| CN | 106028356 A | | 10/2016 |
| CN | 106331184 A | | 1/2017 |
| CN | 107079462 A | | 8/2017 |
| EP | 2897336 B1 | | 8/2017 |
| EP | 3236377 A1 | | 10/2017 |
| IN | 201847008803 A | | 4/2018 |
| WO | 2015133754 A1 | | 9/2015 |

OTHER PUBLICATIONS

Orange: "New use case: Prevention of various security attacks," 3GPP Draft; S2-183942 WAS-3837, Apr. 20, 2018, XP051432867, 1 page.

3GPP TS 23.501 V15.1.0 (Mar. 2018), 3rd Generation Partnership Project; Technical Specification Group Services and System Aspects; System Architecture for the 5G System; Stage 2 (Release 15), 201 pages.

3GPP TS 23.502 V15.1.0 (Mar. 2018), 3rd Generation Partnership Project; Technical Specification Group Services and System Aspects; Procedures for the 5G System; Stage 2 (Release 15), 285 pages.

3GPP TS 23.503 V15.1.0 (Mar. 2018), 3rd Generation Partnership Project; Technical Specification Group Services and System Aspects; Policy and Charging Control Framework for the 5G System; Stage 2 (Release 15), 65 pages.

3GPP TS 23.682 V15.4.0 (Mar. 2018), 3rd Generation Partnership Project; Technical Specification Group Services and System Aspects; Architecture enhancements to facilitate communications with packet data networks and applications (Release 15), 124 pages.

3GPP TR 23.791 V0.3.0 (Apr. 2018), 3rd Generation Partnership Project; Technical Specification Group Services and System Aspects; Study of Enablers for Network Automation for 5G (Release 16), 19 pages.

3GPP TS 29.512 V1.0.0 (Jun. 2018), 3rd Generation Partnership Project; Technical Specification Group Core Network and Terminals; 5G System; Session Management Policy Control Service; Stage 3 (Release 15), 82 pages.

China Mobile, "Use Case on mIoT behaviour data collection and analysis," SA WG2 Meeting #126, S2-182086, Feb. 26-Mar. 2, 2018, Montreal, Canada, 2 pages.

China Mobile, "Use Case on mIoT behaviour data collection and analysis," SA WG2 Meeting #126, S2-182353, Feb. 26-Mar. 2, 2018, Montreal, Canada, 2 pages.

China Mobile, "Key issue on performance improvement and supervision of mIoT terminals", SA WG2 Meeting #127, S2-183601, Apr. 16-20, 2018, Sanya, China, 2 pages.

China Mobile, "Key issue on performance improvement and supervision of mIoT terminals," SA WG2 Meeting #127, S2-183948, Apr. 16-20, 2018, Sanya, China, 2 pages.

China Mobile, "Key issue on performance improvement and supervision of mIoT terminals," SA WG2 Meeting #127, S2-184575, Apr. 16-20, 2018, Sanya, China, 2 pages.

\* cited by examiner

METHOD FOR PROVIDING RESTRICTED SERVICE, AND COMMUNICATIONS DEVICE

CROSS-REFERENCE TO RELATED APPLICATIONS

This is a continuation of U.S. patent application Ser. No. 17/120,720 filed on Dec. 14, 2020, which is a continuation of International Patent Application No. PCT/CN2019/091145 filed on Jun. 13, 2019, which claims priority to Chinese Patent Application No. 201810627352.8 filed on Jun. 13, 2018. All of the aforementioned patent applications are hereby incorporated by reference in their entireties.

TECHNICAL FIELD

Embodiments of this application relate to the communications field, and in particular, to a method for providing a restricted service, and a communications device.

BACKGROUND

With continuous development of science and technology, the Internet of things (IoT) has been gaining in popularity. The IoT allows IoT devices to connect to the Internet using an information sensing device and exchange information, to achieve intelligent identification and management of the IoT devices. Currently, IoT devices such as a smart water meter and a lock of a shared bicycle are basically simple devices, and have comparatively simple functions and security risks. For example, the IoT devices are vulnerable to hacker attacks, hijacking, and abuse, and therefore an abnormality occurs.

In other approaches, a deregistration method is used for an abnormal IoT device, such that a network side deletes a registration management context and a protocol data unit (PDU) session of the IoT device, to effectively reduce security risks. However, after the abnormal IoT device is deregistered, maintenance and management such as installing a patch and upgrading software can only be manually performed on the IoT device. This lowers management efficiency of the IoT device.

Therefore, when the IoT device is abnormal, how to effectively reduce security risks and improve management efficiency of the IoT device has become an important research subject for a person skilled in the art.

SUMMARY

Embodiments of this application provide a method for providing a restricted service, and a communications device, to effectively reduce security risks and improve management efficiency of an IoT device when the IoT device is abnormal.

To achieve the foregoing objectives, the following technical solutions are used in the embodiments of this application.

According to a first aspect, an embodiment of this application provides a method for providing a restricted service, where the method may include: receiving, by a policy control function (PCF), an identifier of a terminal and indication information, where the indication information is used to indicate that the terminal is in a state of exception or indicate an exception type of the terminal; and sending, by the PCF, the identifier of the terminal and a first restricted service policy according to the indication information, where the first restricted service policy is used to provide a restricted service for the terminal. According to the method for providing a restricted service provided in this embodiment of this application, after receiving the identifier of the terminal and the indication information used to indicate that the terminal is in the state of exception or indicate the exception type of the terminal, the PCF sends, according to the indication information, the identifier of the terminal and the first restricted service policy used to provide the restricted service for the terminal, to provide the restricted service for the terminal, instead of directly deregistering the terminal when the terminal is abnormal. This effectively reduces security risks and improves management efficiency of the terminal.

With reference to the first aspect, in a possible implementation, the restricted service includes any one of the following: stopping an uplink data flow; restricting a downlink data flow; or stopping an uplink data flow and restricting a downlink data flow. In this way, a more accurate restricted service can be provided for the terminal.

With reference to the first aspect or the foregoing possible implementation, in another possible implementation, the sending, by the PCF, the identifier of the terminal and a first restricted service policy may include: sending, by the PCF, the identifier of the terminal and the first restricted service policy to a session management function (SMF).

With reference to the first aspect or the foregoing possible implementation, in another possible implementation, the restricted service may include: stopping an uplink data flow; and the sending, by the PCF, the identifier of the terminal and a first restricted service policy may include: sending, by the PCF, the identifier of the terminal and the first restricted service policy to an access and mobility management function (AMF).

With reference to the first aspect or the foregoing possible implementation, in another possible implementation, the receiving, by a PCF, an identifier of a terminal and indication information may include: receiving, by the PCF, the identifier of the terminal and the indication information from a network data analytics function (NWDAF), an AF, or the SMF.

According to a second aspect, an embodiment of this application provides a method for providing a restricted service, where the method may include: receiving, by an SMF, an identifier of a terminal and a first restricted service policy; and when the first restricted service policy is used to stop an uplink data flow of the terminal, sending, by the SMF, a second restricted service policy to the terminal, where the second restricted service policy is used to stop the uplink data flow of the terminal; or when the first restricted service policy is used to stop an uplink data flow of the terminal, sending, by the SMF, an identifier of the terminal and a third restricted service policy to an access network device, where the third restricted service policy is used to stop the uplink data flow of the terminal; or when the first restricted service policy is used to restrict a downlink data flow of the terminal, sending, by the SMF, an identifier of the terminal and a fourth restricted service policy to a user plane function (UPF), where the fourth restricted service policy is used to restrict the downlink data flow of the terminal; or when the first restricted service policy is used to stop an uplink data flow of the terminal and restrict a downlink data flow of the terminal, sending, by the SMF, a second restricted service policy to the terminal, or sending an identifier of the terminal and a third restricted service policy to an access network device, and sending the identifier of the terminal and a fourth restricted service policy to the UPF, where the second restricted service policy is used to stop the uplink data flow of the terminal, the third restricted service policy is used to stop the uplink data flow of the terminal, and the fourth restricted service policy is used to restrict the downlink data flow of the terminal. According to the method for providing a restricted service provided in this embodiment of this application, after receiving the identifier of the terminal and the first restricted service policy used to provide a restricted service for the terminal, the SMF sends, according to the first restricted service policy, a restricted service policy corresponding to a communications device to the communications device. As such, the communications device can provide the restricted service for the terminal, instead of directly deregistering the terminal when the terminal is abnormal. This effectively reduces security risks and improves management efficiency of the terminal.

With reference to the second aspect, in a possible implementation, the second restricted service policy may include a quality of service (QoS) rule, and the QoS rule is used to stop an uplink data flow; or the third restricted service policy may include a QoS configuration file, and the QoS configuration file is used to stop an uplink data flow; or the fourth restricted service policy may include QoS information, and the QoS information is used to restrict a downlink data flow.

With reference to the second aspect or the foregoing possible implementation, in another possible implementation, the receiving, by a session management function SMF, an identifier of a terminal and a first restricted service policy may include: receiving, by the SMF, the identifier of the terminal and the first restricted service policy from a PCF, a unified data management (UDM), or an AMF.

With reference to the second aspect or the foregoing possible implementation, in another possible implementation, before the receiving, by the SMF, the identifier of the terminal and the first restricted service policy from a PCF, the method may further include: receiving, by the SMF, the identifier of the terminal and indication information from the AMF, where the indication information is used to indicate that the terminal is in a state of exception or an exception type of the terminal; and sending, by the SMF, the identifier of the terminal and the indication information to the PCF.

According to a third aspect, an embodiment of this application provides a method for providing a restricted service, where the method may include: receiving, by an AMF, an identifier of a terminal and a first restricted service policy from a PCF, where the first restricted service policy is used to provide a restricted service for the terminal; and sending, by the AMF, a second restricted service policy to the terminal according to the first restricted service policy, where the second restricted service policy is used to stop an uplink data flow of the terminal; or sending, by the AMF, the identifier of the terminal and a third restricted service policy to an access network device according to the first restricted service policy, where the third restricted service policy is used to stop an uplink data flow of the terminal. According to the method for providing a restricted service provided in this embodiment of this application, after receiving the identifier of the terminal and the first restricted service policy used to provide the restricted service for the terminal, the AMF sends, according to the first restricted service policy, a restricted service policy corresponding to a communications device to the communications device, such that the communications device can provide the restricted service for the terminal, instead of directly deregistering the terminal when the terminal is in a state of exception. This effectively reduces security risks and improves management efficiency of the terminal.

With reference to the third aspect, in a possible implementation, the second restricted service policy may include indication information, and the indication information is used to instruct to update or modify a threshold value of a user equipment (UE) route selection policy (URSP) of the terminal to a first value, and the first value is used to stop an uplink data flow. Alternatively, the third restricted service policy may include a QoS configuration file, and the QoS configuration file is used to stop an uplink data flow.

According to a fourth aspect, an embodiment of this application provides a method for providing a restricted service, where the method may include: determining, by a first network element, that a terminal is in a state of exception; and sending, by the first network element, an identifier of the terminal and indication information to a PCF, where the indication information is used to indicate that the terminal is in the state of exception or indicate an exception type of the terminal. According to the method for providing a restricted service provided in this embodiment of this application, when determining that the terminal is in the state of exception, the first network element sends the identifier of the terminal and the indication information used to indicate that the terminal is in the state of exception or indicate the exception type of the terminal to the PCF. As such, the PCF can send, according to the indication information, the identifier of the terminal and a first restricted service policy used to provide a restricted service for the terminal, to provide the restricted service for the terminal, instead of directly deregistering the terminal when the terminal is abnormal. This effectively reduces security risks and improves management efficiency of the terminal.

With reference to the fourth aspect, in a possible implementation, the determining, by a first network element, that a terminal is in a state of exception may include: determining, by the first network element based on traffic information of the terminal, that the terminal is in the state of exception, where the traffic information may include uplink traffic information and/or downlink traffic information.

With reference to the fourth aspect or the foregoing possible implementation, in another possible implementation, the exception type includes any one of the following: abnormal uplink traffic; abnormal downlink traffic; and abnormal uplink traffic and abnormal downlink traffic. In this way, a more accurate restricted service can be provided for the terminal based on the classified exception types.

With reference to the fourth aspect or the foregoing possible implementation, in another possible implementation, the first network element may be an NWDAF or an AF.

According to a fifth aspect, an embodiment of this application provides a method for providing a restricted service, where the method may include: receiving, by a UDM, an identifier of a terminal and a first restricted service policy from an application function (AF), where the first restricted service policy is used to provide a restricted service for the terminal; and sending, by the UDM, the identifier of the terminal and the first restricted service policy to an AMF or an SMF. According to the method for providing a restricted service provided in this embodiment of this application, after receiving the identifier of the terminal and the first restricted service policy used to provide the restricted service for the terminal, the UDM sends the identifier of the terminal and the first restricted service policy to the AMF or the SMF, to provide the restricted service for the terminal, instead of directly deregistering the terminal when the terminal is in a state of exception. This effectively reduces security risks and improves management efficiency of the terminal.

With reference to the fifth aspect, in a possible implementation, the restricted service may include any one of the following: stopping an uplink data flow; restricting a downlink data flow; or stopping an uplink data flow and restricting a downlink data flow. In this way, a more accurate restricted service can be provided for the terminal.

According to a sixth aspect, an embodiment of this application provides a method for providing a restricted service, where the method may include: determining, by an AF, that a terminal is in a state of exception and a restricted service policy corresponding to an exception, where the restricted service policy corresponding to the exception is used to provide a restricted service for the terminal; and sending, by the AF, the identifier of the terminal and the restricted service policy corresponding to the exception to a UDM. According to the method for providing a restricted service provided in this embodiment of this application, when determining that the terminal is in the state of exception, the AF may determine the restricted service policy corresponding to the exception, and send the identifier of the terminal and the restricted service policy used to provide the restricted service for the terminal, such that a communications device can provide the restricted service for the terminal according to the restricted service policy, instead of directly deregistering the terminal when the terminal is abnormal. This effectively reduces security risks and improves management efficiency of the terminal.

With reference to the sixth aspect, in a possible implementation, the determining, by an AF, that a terminal is in a state of exception may include: determining, by the AF based on the traffic information of the terminal, that the terminal is in a state of exception, where the traffic information may include uplink traffic information and/or downlink traffic information.

With reference to the sixth aspect or the foregoing possible implementation, in another possible implementation, the restricted service includes any one of the following: stopping an uplink data flow; restricting a downlink data flow; or stopping an uplink data flow and restricting a downlink data flow. In this way, a more accurate restricted service can be provided for the terminal.

According to a seventh aspect, an embodiment of this application provides a communications device, where the communications device may include: a receiving unit configured to receive an identifier of a terminal and indication information, where the indication information is used to indicate that the terminal is in a state of exception or indicate an exception type of the terminal; and a sending unit configured to send the identifier of the terminal and a first restricted service policy according to the indication information received by the receiving unit, where the first restricted service policy is used to provide a restricted service for the terminal.

With reference to the seventh aspect, in a possible implementation, the restricted service may include any one of the following: stopping an uplink data flow; restricting a downlink data flow; or stopping an uplink data flow and restricting a downlink data flow.

With reference to the seventh aspect or the foregoing possible implementation, in another possible implementation, the sending unit may be configured to: send the identifier of the terminal and the first restricted service policy to an SMF.

With reference to the seventh aspect or the foregoing possible implementation, in another possible implementation, the restricted service may include stopping an uplink data flow. Additionally, the sending unit may be configured to send the identifier of the terminal and the first restricted service policy to an AMF.

With reference to the seventh aspect or the foregoing possible implementation, in another possible implementation, the receiving unit may be configured to receive the identifier of the terminal and the indication information from an NWDAF, an AF, or the SMF.

According to an eighth aspect, an embodiment of this application provides a communications device, where the communications device may include a receiving unit configured to receive an identifier of a terminal and a first restricted service policy; and a sending unit configured to: when the first restricted service policy received by the receiving unit is used to stop an uplink data flow of the terminal, send a second restricted service policy to the terminal, where the second restricted service policy is used to stop the uplink data flow of the terminal; or when the first restricted service policy received by the receiving unit is used to stop an uplink data flow of the terminal, send an identifier of the terminal and a third restricted service policy to an access network device, where the third restricted service policy is used to stop the uplink data flow of the terminal; or when the first restricted service policy received by the receiving unit is used to restrict a downlink data flow of the terminal, send an identifier of the terminal a fourth restricted service policy to a UPF, where the fourth restricted service policy is used to restrict the downlink data flow of the terminal; or when the first restricted service policy received by the receiving unit is used to stop an uplink data flow of the terminal and restrict a downlink data flow of the terminal, send a second restricted service policy to the terminal, or send an identifier of the terminal and a third restricted service policy to an access network device, and send the identifier of the terminal and a fourth restricted service policy to the UPF, where the second restricted service policy is used to stop the uplink data flow of the terminal, the third restricted service policy is used to stop the uplink data flow of the terminal, and the fourth restricted service policy is used to restrict the downlink data flow of the terminal.

With reference to the eighth aspect, in a possible implementation, the second restricted service policy may include a QoS rule, and the QoS rule is used to stop an uplink data flow; or the third restricted service policy may include a QoS configuration file, and the QoS configuration file is used to stop an uplink data flow; or the fourth restricted service policy may include QoS information, and the QoS information is used to restrict a downlink data flow.

With reference to the eighth aspect or the foregoing possible implementation, in another possible implementation, the receiving unit may be configured to: receive the identifier of the terminal and the first restricted service policy from a PCF, a UDM, or an AMF.

With reference to the eighth aspect or the foregoing possible implementation, in another possible implementation, the receiving unit may be further configured to receive the identifier of the terminal and indication information from the AMF, where the indication information is used to indicate that the terminal is in a state of exception or an exception type of the terminal. Additionally, the sending unit is further configured to send the identifier of the terminal and the indication information to the PCF.

According to a ninth aspect, an embodiment of this application provides a communications device, where the communications device may include: a receiving unit configured to receive an identifier of a terminal and a first restricted service policy from a PCF, where the first restricted service policy is used to provide a restricted service for the terminal. The communications device may further include a sending unit configured to: send a second restricted service policy to the terminal according to the first restricted service policy, where the second restricted service policy is used to stop an uplink data flow of the terminal; or send the identifier of the terminal and a third restricted service policy to an access network device according to the first restricted service policy, where the third restricted service policy is used to stop an uplink data flow of the terminal.

With reference to the ninth aspect, in a possible implementation, the second restricted service policy may include indication information, and the indication information is used to instruct to update or modify a threshold value of a URSP of the terminal to a first value, and the first value is used to stop an uplink data flow; or the third restricted service policy may include a QoS configuration file, and the QoS configuration file is used to stop an uplink data flow.

According to a tenth aspect, a communications device is provided, where the communications device may include: a determining unit configured to determine that a terminal is in a state of exception; and a sending unit configured to send an identifier of the terminal and indication information to a PCF, where the indication information is used to indicate that the terminal is in the state of exception or indicate an exception type of the terminal.

With reference to the tenth aspect, in a possible implementation, the determining unit may be configured to determine, based on traffic information of the terminal, that the terminal is in the state of exception, where the traffic information may include uplink traffic information and/or downlink traffic information.

With reference to the tenth aspect or the foregoing possible implementation, in another possible implementation, the exception type may include any one of the following: abnormal uplink traffic; abnormal downlink traffic; or abnormal uplink traffic and abnormal downlink traffic.

With reference to the tenth aspect or the foregoing possible implementation, in another possible implementation, the communications device may be an NWDAF or an AF.

According to an eleventh aspect, a communications device is provided, where the communications device may include: a receiving unit configured to receive an identifier of a terminal and a first restricted service policy from an AF, where the first restricted service policy is used to provide a restricted service for the terminal; and a sending unit configured to send the identifier of the terminal and the first restricted service policy to an AMF or an SMF.

With reference to the eleventh aspect, in a possible implementation, the restricted service may include any one of the following: stopping an uplink data flow; restricting a downlink data flow; or stopping an uplink data flow and restricting a downlink data flow.

According to a twelfth aspect, a communications device is provided, where the communications device may include: a determining unit configured to determine that a terminal is in a state of exception and a restricted service policy corresponding to an exception, where the restricted service policy corresponding to the exception is used to provide a restricted service for the terminal; and a sending unit configured to send to a UDM, the identifier of the terminal and the restricted service policy that is corresponding to the exception and that is determined by the determining unit.

With reference to the twelfth aspect, in a possible implementation, the determining unit may be configured to determine, based on the traffic information of the terminal, that the terminal is in the state of exception, where the traffic information may include uplink traffic information and/or downlink traffic information.

With reference to the twelfth aspect or the foregoing possible implementation, in another possible implementation, the restricted service may include any one of the following: stopping an uplink data flow; restricting a downlink data flow; or stopping an uplink data flow and restricting a downlink data flow.

According to a thirteenth aspect of the embodiments of this application, a communications device is provided, and includes at least one processor and a memory, where the memory is configured to store a computer program. As such, when the computer program is executed by the at least one processor, the computer program implements the method for providing a restricted service according to any one of the first aspect or the possible implementations of the first aspect.

According to a fourteenth aspect, a computer-readable storage medium is provided and is configured to store a computer program. The computer program is used to perform the method for providing a restricted service according to any one of the first aspect or the possible implementations of the first aspect.

According to a fifteenth aspect, a communications device is provided, and includes at least one processor and a memory, where the memory is configured to store a computer program, such that when the computer program is executed by the at least one processor, the computer program implements the method for providing a restricted service according to any one of the second aspect or the possible implementations of the second aspect.

According to a sixteenth aspect, a computer-readable storage medium is provided and is configured to store a computer program. The computer program is used to perform the method for providing a restricted service according to any one of the second aspect or the possible implementations of the second aspect.

According to a seventeenth aspect, a communications device is provided, and includes at least one processor and a memory, where the memory is configured to store a computer program, such that when the computer program is executed by the at least one processor, the computer program implements the method for providing a restricted service according to any one of the third aspect or the possible implementations of the third aspect.

According to an eighteenth aspect, a computer-readable storage medium is provided and is configured to store a computer program. The computer program is used to perform the method for providing a restricted service according to any one of the third aspect or the possible implementations of the third aspect.

According to a nineteenth aspect, a communications device is provided, and includes at least one processor and a memory, where the memory is configured to store a computer program, such that when the computer program is executed by the at least one processor, the computer program implements the method for providing a restricted service according to any one of the fourth aspect or the possible implementations of the fourth aspect.

According to a twentieth aspect, a computer-readable storage medium is provided and is configured to store a computer program. The computer program is used to perform the method for providing a restricted service according to any one of the fourth aspect or the possible implementations of the fourth aspect.

According to a twenty-first aspect, a communications device is provided, and includes at least one processor and a memory, where the memory is configured to store a computer program, such that when the computer program is executed by the at least one processor, the computer program implements the method for providing a restricted service according to any one of the fifth aspect or the possible implementations of the fifth aspect.

According to a twenty-second aspect, a computer-readable storage medium is provided and is configured to store a computer program. The computer program is used to perform the method for providing a restricted service according to any one of the fifth aspect or the possible implementations of the fifth aspect.

According to a twenty-third aspect, a communications device is provided, and includes at least one processor and a memory, where the memory is configured to store a computer program, such that when the computer program is executed by the at least one processor, the computer program implements the method for providing a restricted service according to any one of the sixth aspect or the possible implementations of the sixth aspect.

According to a twenty-fourth aspect, a computer-readable storage medium is provided and is configured to store a computer program. The computer program is used to perform the method for providing a restricted service according to any one of the sixth aspect or the possible implementations of the sixth aspect.

According to a twenty-fifth aspect, a chip system is provided, and includes a processor configured to implement functions in the foregoing aspects, for example, generating or processing data and/or information in the foregoing methods. In a possible design, the chip system further includes a memory. The memory is configured to store a program instruction and data that are necessary for the communications device. The chip system may include a chip, or may include a chip and another discrete device.

It may be understood that, the communications devices described in the seventh aspect to the thirteenth aspect, the fifteenth aspect, the seventeenth aspect, the nineteenth aspect, the twenty-first aspect, and the twenty-third aspect, the computer-readable storage medium described in the fourteenth aspect, the sixteenth aspect, the eighteenth aspect, the twentieth aspect, the twenty-second aspect, and the twenty-fourth aspect, and the chip system described in the twenty-fifth aspect are all configured to perform the corresponding methods described above. For advantageous effects that can be achieved, refer to advantageous effects in the corresponding methods. Details are not described herein again.

DESCRIPTION OF EMBODIMENTS

The term "and/or" in the embodiments describes only an association relationship for describing associated objects and indicates that three relationships may exist. For example, A and/or B may represent the following three cases: Only A exists, both A and B exist, and only B exists. In addition, the character "/" in the following embodiments generally indicates an "or" relationship between the associated objects.

The following describes the implementations of the embodiments of this application in detail with reference to accompanying drawings.

A method for providing a restricted service provided in the embodiments of this application may be applied to any mobile communications system that needs to provide a restricted service for a terminal. For example, the method may be applied to a 5G mobile communications system shown in FIG. 1.

Figure 1:
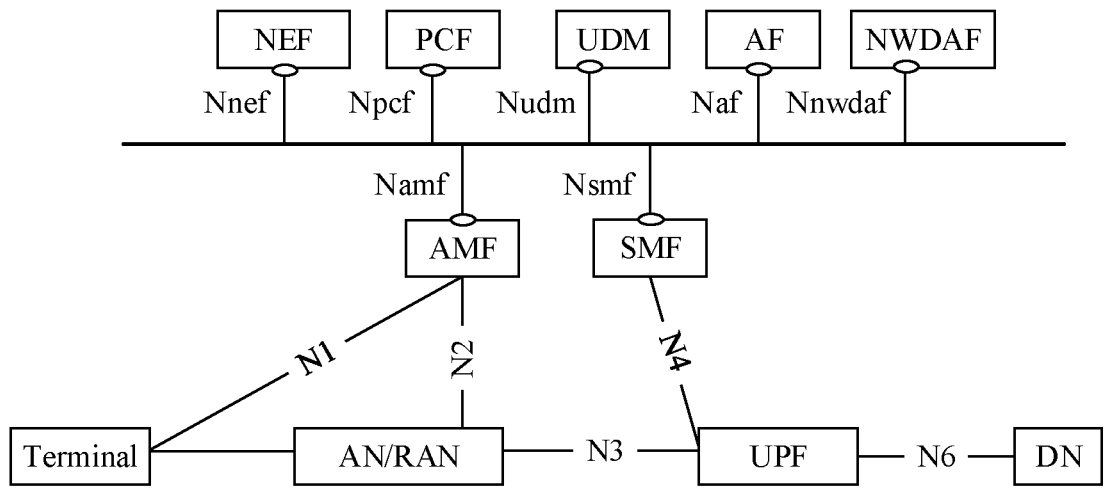
FIG. 1 is a simplified schematic diagram of a 5th generation (5G) mobile communications system according to an embodiment of this application.

As shown in FIG. 1, the 5G mobile communication system may include a terminal and an access network device, for example, an access network (AN)/radio access network (RAN), a data network (DN), and a plurality of network functions (NFs): a network exposure function (NEF), a policy control function (PCF), a unified data management (UDM), an application function (AF), a network data analytics function (NWDAF), an access and mobility management function (AMF), a session management function (SMF), and a user plane function (UPF).

It may be understood that FIG. 1 is merely an example diagram of a structure of the 5G mobile communications system. In addition to communications devices shown in FIG. 1, the 5G mobile communications system may further include other communications devices, such as an authentication server function (AUSF). This is not limited in this embodiment of this application.

In the 5G mobile communications system shown in FIG. 1, the communications devices such as the NEF, the PCF, the UDM, the AF, the NWDAF, the AMF, and the SMF may be connected using a communications bus. Based on the communications bus, the communications devices may establish a connection by invoking a corresponding service-oriented interface, to communicate with each other. For example, the NEF may invoke an Nnef interface to establish a connection to the AF, the UDM, or another communications device connected to the communications bus, to communicate with each other. The PCF may invoke an Npcf interface to establish a connection to the AF, the SMF, the NWDAF, the AMF, or another communications device connected to the communications bus, to communicate with each other. The UDM may invoke an Nudm interface to establish a connection to the SMF or the AMF, or another communications device connected to the communications bus, to communicate with each other. The AF may invoke an Naf interface to establish a connection to the NEF or another communications device connected to the communications bus, to communicate with each other. The NWDAF may invoke an Nnwdaf interface to establish a connection to the PCF or another communications device connected to the communications bus, to communicate with each other. The AMF may invoke an Namf interface to establish a connection to the SMF or another communications device connected to the communications bus, to communicate with each other. The SMF may invoke an Nsmf interface to establish a connection to the PCF or another communications device connected to the communications bus, to communicate with each other.

The communications devices such as the AMF, the SMF, the UPF, the DN, the AN/RAN, and the terminal may establish a connection using a next-generation network (next generation, NG) interface, to communicate with each other. For example, the terminal may establish a control plane signaling connection to the AMF using an N interface 1 (N1). The AN/RAN may establish a user plane data connection to the UPF using an N interface 3 (N3). The AN/RAN may establish a control plane signaling connection to the AMF using an N interface 2 (N2). The UPF may establish a control plane signaling connection to the SMF using an N interface 4 (N4). The UPF may exchange user plane data with the DN using an N interface 6 (N6).

It should be noted that names of the communications devices and the interfaces between the communications devices in the foregoing structure are merely examples. In an implementation, the communications devices and the interfaces between the communications devices may have other names. This is not specifically limited in the embodiments of this application.

With reference to FIG. 1, the communications devices shown in FIG. 1 are described as follows.

The terminal may be a wireless or wired terminal. A wireless terminal may refer to a device that provides a user with voice and/or data connectivity, a handheld device with a wireless connection function, or another processing device connected to a wireless modem. The wireless terminal may communicate with one or more communications devices such as an AMF or an SMF in a core network using an AN/RAN. The wireless terminal may be a mobile terminal, for example, a mobile phone (or referred to as a "cellular" phone), a smartphone, a satellite wireless device, a wireless modem card, and a computer with a mobile terminal. For example, the computer with a mobile terminal may be a laptop, portable, pocket-sized, handheld, computer built-in, or in-vehicle mobile apparatus that exchanges voice and/or data with a radio access network. For example, the wireless terminal may be a personal communication service (PCS) phone, a cordless telephone set, a Session Initiation Protocol (SIP) phone, a wireless local loop (WLL) station, a personal digital assistant (PDA), or another device. The wireless terminal may also be referred to as a system, a subscriber unit, a subscriber station, a mobile station, a mobile console (mobile), a remote station, an access point, a remote terminal, an access terminal, a user terminal, a user equipment (UE), or a user agent. The terminal may alternatively be a relay.

The AN/RAN may be a network including a plurality of 5G-ANs/5G-RANs, and is configured to implement functions such as a radio physical layer function, resource scheduling, radio resource management, radio access control, and mobility management. The 5G-AN/5G-RAN may be an access node, a next-generation base station (e.g., generation nodeB (gNB)), a transmission reception point (TRP), a transmission point (TP), or another access network device.

The NWDAF may provide a network data analytics service.

The PCF provides a policy rule and another function to a control plane network element, for example, the NWDAF.

The NEF may be configured to exchange internal and external information, and the like of a network.

The UDM provides functions such as managing subscription data of a user and generating authentication information of the user.

The AF may be an application server that may belong to an operator or a third party.

The AMF may be a termination point of a control plane (the N2 interface) of a radio access network, a termination point of non-access stratum (NAS) signaling (the N1 interface), and has functions such as performing mobility management, lawful interception, and access authorization/authentication on a terminal.

The SMF has functions such as establishing, modifying, and deleting a session.

The UPF is an anchor for radio access technology handover, and may be configured to perform functions such as routing and forwarding of user plane data. For example, the UPF is responsible for filtering a data packet, transmitting/forwarding data, performing rate control, generating charging information, and the like for the terminal.

Figure 2:
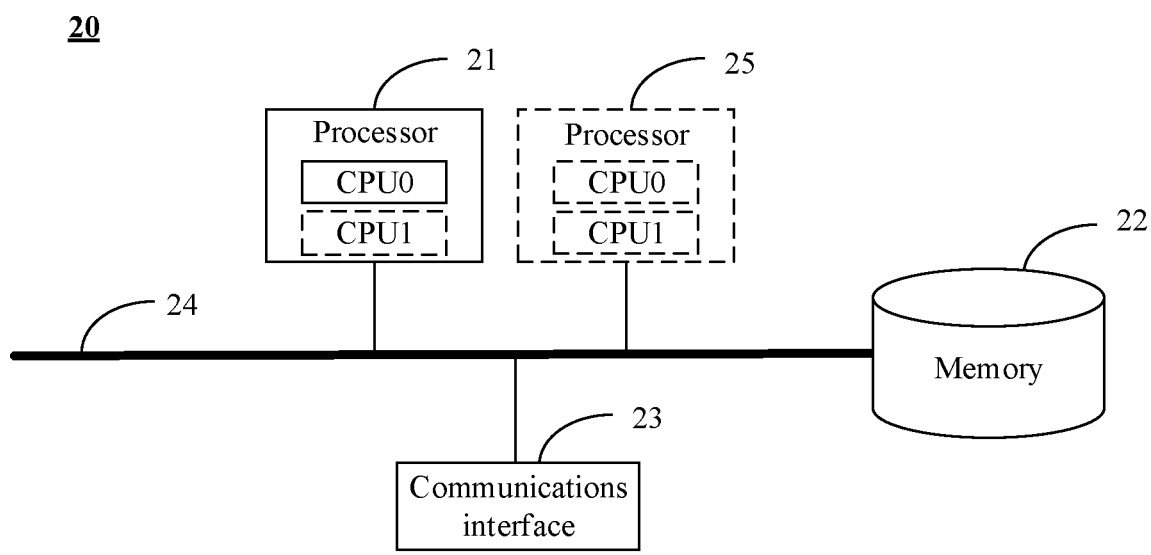
FIG. 2 is a schematic diagram of a structure of a communications device according to an embodiment of this application.

FIG. 2 is a schematic diagram of a structure of a communications device 20 according to an embodiment of this application. FIG. 2 shows a structure of the AN/RAN, the NEF, the PCF, the UDM, the AF, the NWDAF, the AMF, the SMF, the UPF, and the terminal in the 5G mobile communications system shown in FIG. 1. As shown in FIG. 2, the communications device 20 may include at least one processor 21, a memory 22, a communications interface 23, and a communications bus 24. The processor 21, the memory 22, and the communications interface 23 may be connected to each other using the communications bus 24.

It should be noted that the device structure shown in FIG. 2 constitutes no limitation on the communications device 20. The communications device 20 may include more or fewer components than those shown in the figure, or combine some components, or have different component arrangements. This is not limited in the embodiments of this application. The following describes each constituent component of the communications device 20 with reference to FIG. 2.

The processor 21 is a control center of the communications device, and may be one processor or may be a collective name of a plurality of processing components. For example, the processor 21 may be a central processing unit (CPU), or an application-specific integrated circuit (ASIC), or may be configured as one or more integrated circuits implementing the embodiments of this application, for example, one or more digital signal processors (DSP), or one or more field programmable gate arrays (FPGA). The processor 21 may run or execute a software program stored in the memory 22, and invoke data stored in the memory 22, to perform various functions of the communications device 20.

In a possible implementation, the processor 21 may include one or more CPUs, for example, a CPU 0 and a CPU 1 in FIG. 2. In another possible implementation, the communications device 20 may include a plurality of processors, for example, the processor 21 and a processor 25 shown in FIG. 2. Each of these processors may be a single-core processor (single-CPU), or may be a multi-core processor (multi-CPU). The processor herein may be one or more devices, circuits, and/or processing cores configured to process data (for example, a computer program instruction).

The memory 22 may be a read-only memory (ROM), another type of static storage device that can store static information and an instruction, a random-access memory (RAM), or another type of dynamic storage device that can store information and an instruction, or may be an electrically erasable programmable read-only memory (EEPROM), a compact disc read-only memory (CD-ROM), another optical disc storage, an optical disc storage (including a compact disc, a laser disc, an optical disc, a digital versatile disc, a Blu-ray disc, and the like), a disk storage medium, another magnetic storage device, or any other medium that can be used to carry or store expected program code in a form of an instruction or a data structure and that can be accessed by a computer. However, this is not limited thereto. The memory 22 may exist independently, and is connected to the processor 21 using the communications bus 24. Alternatively, the memory 22 may be integrated with the processor 21. The memory 22 is configured to store a software program that performs the solution provided by the embodiments of this application, and the processor 21 controls execution of the software program.

The communications interface 23 is configured to communicate with another device or a communications network, for example, an Ethernet, a RAN, or a wireless local area network (WLAN). The communications interface 23 may be implemented using any apparatus such as a transceiver.

The communications bus 24 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 2, but this does not mean that there is only one bus or only one type of bus.

The method for providing a restricted service provided in the embodiments of this application may be applied to the 5G mobile communications system shown in FIG. 1. Detailed descriptions are provided below with reference to the 5G mobile communications system shown in FIG. 1.

Figure 3:
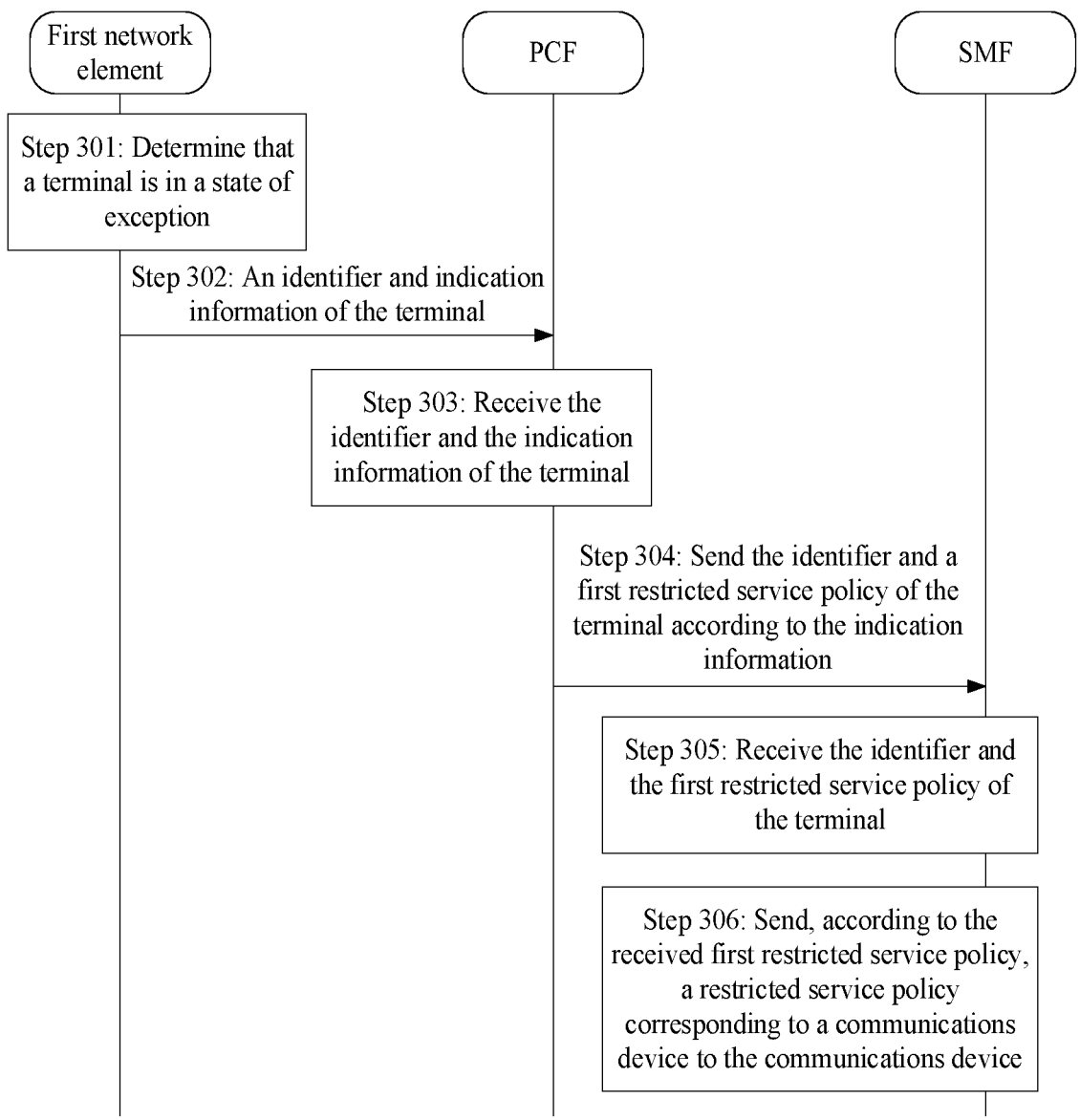
FIG. 3 is a schematic flowchart of a method for providing a restricted service according to an embodiment of this application.

FIG. 3 is a schematic flowchart of a method for providing a restricted service according to an embodiment of this application. The method may include the following steps.

Step 301: A first network element determines that a terminal is in a state of exception.

The first network element may be the NWDAF or the AF in the 5G mobile communications system shown in FIG. 1.

Step 301 may also be referred to as that: A first network element determines, based on traffic information of a terminal, that the terminal is in the state of exception.

It may be understood that the traffic information of the terminal may be classified into uplink traffic information and downlink traffic information based on different flow directions. In this embodiment of this application, the uplink traffic information may be traffic information corresponding to a data packet sent by the terminal to a network-side device (for example, an AN or a RAN). The downlink traffic information may be traffic information corresponding to a data packet sent by the network-side device to the terminal. The uplink traffic information may include at least one of the following: an uplink flow rate, an uplink flow interval, and an uplink flow size. The downlink traffic information may include at least one of the following: a downlink flow rate, a downlink flow interval, and a downlink flow size. The uplink flow rate may refer to a size of a data packet sent by the terminal to the network-side device within a unit time. The uplink flow interval may refer to an interval between data packets sent by the terminal to the network-side device. The uplink flow size refers to a size of each data packet sent by the terminal to the network-side device. The downlink flow rate may refer to a size of a data packet sent by the network-side device to the terminal within a unit time. The downlink flow interval may refer to an interval between data packets sent by the network-side device to the terminal. The downlink flow size refers to a size of each data packet sent by the network-side device to the terminal.

For example, in a possible implementation, that the first network element determines, based on traffic information of a terminal (the traffic information may include the uplink traffic information and/or the downlink traffic information), that the terminal is in the state of exception may include: The first network element may determine, based on whether the traffic information of the terminal meets a specific condition, whether the terminal is in the state of exception. If the uplink traffic information and/or the downlink traffic information of the terminal do/does not meet the specific condition, the first network element may determine that the terminal is in the state of exception. If both the uplink traffic information and the downlink traffic information of the terminal meet the specific condition, the first network element may determine that the terminal is not in the state of exception or is normal. The specific condition may be set based on historical traffic information of a large quantity of terminals and an exception result corresponding to the historical traffic information. The exception result may include that the terminal is in the state of exception and the terminal is not in the state of exception (or is normal). It should be noted that, in the embodiments of this application, "the terminal is in a state of exception" may also be referred to as "terminal traffic is abnormal." For example, if the traffic information of the terminal includes a flow rate (for example, an uplink flow rate and/or a downlink flow rate), when the flow rate of the terminal is greater than 2 Mbit/s (M/s), the first network element may determine that the terminal is in the state of exception. For another example, if the traffic information of the terminal includes a flow rate (for example, an uplink flow rate and/or a downlink flow rate) and a flow interval (for example, an uplink flow interval and/or a downlink flow interval), when the flow rate of the terminal is greater than 2 2 Mbit/s, and the flow interval is greater than a preset value, the first network element may determine that the terminal is in the state of exception.

For example, in another possible implementation, that the traffic information of the terminal does not meet the specific condition may include the following three cases: 1. The uplink traffic information of the terminal does not meet the specific condition. 2. The downlink traffic information of the terminal does not meet the specific condition. 3. Neither the uplink traffic information nor the downlink traffic information of the terminal meets the specific condition. Correspondingly, that the first network element determines, based on traffic information of a terminal (the traffic information may include the uplink traffic information and/or the downlink traffic information), that the terminal is in the state of exception may include: When determining that the terminal is in the state of exception, the first network element may further determine an exception type of the terminal based on the traffic information of the terminal. The exception type may include any one of the following: abnormal uplink traffic; abnormal downlink traffic; and abnormal uplink traffic and abnormal downlink traffic. When determining that the uplink traffic information of the terminal does not meet the specific condition, the first network element may determine that the exception type of the terminal is in the state of exception uplink traffic. For example, when determining that the uplink flow rate of the terminal is greater than 2 Mbit/s, the first network element may determine that the exception type of the terminal is in the state of exception uplink traffic. Alternatively, when determining that the downlink traffic information of the terminal does not meet the specific condition, the first network element may determine that the exception type of the terminal is in the state of exception downlink traffic. For example, when determining that the downlink flow rate of the terminal is greater than 2 Mbit/s, the first network element may determine that the exception type of the terminal is in the state of exception downlink traffic. Alternatively, when determining that neither the uplink traffic information nor the downlink traffic information of the terminal meets the specific condition, the first network element determines that the exception type of the terminal is in the state of exception uplink traffic and abnormal downlink traffic. For example, when determining that the uplink flow rate and the downlink flow rate of the terminal are greater than 2 Mbit/s, the first network element may determine that the exception type of the terminal is in the state of exception uplink traffic and abnormal downlink traffic.

In a possible implementation, the traffic information of the terminal may be reported to the first network element by a communications device, such as an AMF. For example, the AMF reports the traffic information of the terminal to the first network element. The AMF may monitor uplink traffic of the terminal and determine whether the uplink traffic of the terminal exceeds a threshold. When the uplink traffic of the terminal exceeds the threshold, the AMF may report the uplink traffic information of the terminal to the first network element. Alternatively, the AMF may monitor downlink traffic of the terminal and determine whether the downlink traffic of the terminal exceeds a threshold. When the downlink traffic of the terminal exceeds the threshold, the AMF may report the downlink traffic information of the terminal to the first network element. Alternatively, the AMF may monitor both the uplink traffic and the downlink traffic of the terminal. When both the uplink traffic information and the downlink traffic information of the terminal exceed the threshold, the AMF may report the uplink traffic information and the downlink traffic information of the terminal to the first network element. The AMF may periodically monitor traffic of the terminal (for example, the uplink traffic and/or the downlink traffic), or may monitor the traffic of the terminal according to a monitoring event delivered by the first network element. The monitoring event may be used to instruct to monitor the traffic of the terminal.

Step 302: The first network element sends an identifier of the terminal and indication information to a PCF.

The indication information may be used to indicate that the terminal is in the state of exception or indicate the exception type of the terminal. In addition, the identifier of the terminal is used to identify the terminal. For example, the identifier may be an internet protocol (IP) address, a mobile subscriber integrated services digital network (MSISDN) number, or the like.

In the embodiments of this application, "the indication information is used to indicate that the terminal is in the state of exception' may also be referred to as "the indication information is used to indicate that the traffic of the terminal is abnormal"; "the indication information is used to indicate the exception type of the terminal" may also be referred to as "the indication information is used to indicate a traffic exception type of the terminal."

If the indication information is used to indicate that the terminal is in the state of exception, in a possible implementation, the indication information may include one bit. For example, when the indication information is "0", the indication information is used to indicate that the terminal is in the state of exception. When the indication information is "1", the indication information is used to indicate that the terminal is not in the state of exception or is normal.

If the indication information is used to indicate the exception type of the terminal, in a possible implementation, the indication information may include two bits. For example, when the indication information is "00", the indication information is used to indicate that the exception type of the terminal is in the state of exception uplink traffic. When the indication information is "01", the indication information is used to indicate that the exception type of the terminal is in the state of exception downlink traffic. When the indication information is "10", the indication information is used to indicate that the exception type of the terminal is in the state of exception uplink traffic and abnormal downlink traffic.

In a possible implementation, in step 302, the first network element may directly send the identifier of the terminal and the indication information to the PCF (as shown in FIG. 3). For details, refer to any embodiment shown in FIG. 4 to FIG. 6. This is not limited herein.

In another possible implementation, in step 302, the first network element may alternatively send the identifier of the terminal and the indication information (not shown in FIG. 3) to the PCF using a communications device such as an NEF, the AMF, or an SMF. For details, refer to any embodiment shown in FIG. 7 to FIG. 9. This is not limited herein.

Step 303: The PCF receives the identifier of the terminal and the indication information.

In a possible implementation, in step 303, the PCF may receive the identifier of the terminal and the indication information from the first network element such as an NWDAF or an AF. For details, refer to any embodiment shown in FIG. 4 to FIG. 6. This is not limited herein.

In another possible implementation, in the step 303, the PCF may alternatively receive the identifier of the terminal and the indication information from the SMF. The SMF may receive the identifier of the terminal and the indication information from the first network element. For details, refer to any embodiment shown in FIG. 7 to FIG. 9. This is not limited herein.

Step 304: The PCF sends the identifier of the terminal and a first restricted service policy according to the indication information.

After receiving the identifier of the terminal and the indication information, the PCF may send the identifier of the terminal and the first restricted service policy to the SMF or the AMF. In FIG. 3, the step 304 to step 306 are described using an example in which the PCF sends the identifier of the terminal and the first restricted service policy to the SMF. This is not limited herein.

The first restricted service policy may be used to provide a restricted service for the terminal. The restricted service may include any one of the following: stopping an uplink data flow; restricting a downlink data flow; or stopping an uplink data flow and restricting a downlink data flow. The first restricted service policy may be stopping an uplink data flow of the terminal, or may be restricting a downlink data flow of the terminal, or may be stopping an uplink data flow and restricting a downlink data flow of the terminal.

"Stopping an uplink data flow" may also be referred to as "stopping an uplink data flow of the terminal on a terminal side/RAN side (stop the uplink (UL) data flow of the Terminal in the Terminal/RAN side)."

"Restricting a downlink data flow" may also be referred to as "restricting a downlink data flow of the terminal, and allowing a downlink data flow only of <a port with a certain IP> to be sent to the terminal (restrict the downlink (DL) data flow for the Terminal, only allow DL data flow from <some port, some ip>)"; or "allowing a downlink data flow only of <a port with a certain IP> to be sent to the terminal." "Restricting a downlink data flow of the terminal, and allowing a downlink data flow only of <a port with a certain IP> to be sent to the terminal" refers to restricting the downlink data flow of the terminal by allowing a downlink data flow only of <a port with a certain IP> to be sent to the terminal.

In the step 304, the PCF may determine the first restricted service policy according to the indication information, and send the identifier of the terminal and the first restricted service policy to the SMF.

For example, in a scenario in which the indication information is used to indicate that the terminal is in the state of exception, the PCF may store a restricted service policy corresponding to an exception of the terminal, namely, the first restricted service policy. The first restricted service policy may be stopping an uplink data flow of the terminal, or may be restricting a downlink data flow of the terminal, or may be stopping an uplink data flow and restricting a downlink data flow of the terminal. The first restricted service policy stored on the PCF may be predefined, or may be preconfigured on the PCF, or may be delivered by another communications device to the PCF. This is not specifically limited in this embodiment of this application. Alternatively, the PCF may store a correspondence between an exception and a restricted service policy, and the PCF determines, based on the correspondence between an exception and a restricted service policy, the restricted service policy corresponding to the exception of the terminal as the first restricted service policy.

For example, in a scenario in which the indication information is used to indicate the exception type of the terminal, with reference to the example in the step 302, the PCF may store a mapping relationship between an exception type and a restricted service policy. As shown in Table 1, the PCF determines, based on the mapping relationship, a restricted service policy corresponding to the exception type as the first restricted service policy.

TABLE 1

| Abnormality type | Restricted service policy |
| --- | --- |
| Abnormal uplink traffic | Stopping an uplink data flow of the terminal |
| Abnormal downlink traffic | Restricting a downlink data flow of the terminal |
| Abnormal uplink traffic and abnormal downlink traffic | Stopping an uplink data flow and restricting a downlink data flow of the terminal |

With reference to Table 1, when the indication information is "00", the indication information is used to indicate that the exception type of the terminal is in the state of exception uplink traffic, and the PCF may determine, based on Table 1, that the first restricted service policy is stopping an uplink data flow of the terminal. When the indication information is "01", the indication information is used to indicate that the exception type of the terminal is in the state of exception downlink traffic, and the PCF may determine, based on Table 1, that the first restricted service policy is restricting a downlink data flow of the terminal. When the indication information is "10", the indication information is used to indicate that the exception type of the terminal is in the state of exception uplink traffic and abnormal downlink traffic, and the PCF may determine, based on Table 1, that the first restricted service policy is stopping an uplink data flow and restricting a downlink data flow of the terminal.

It should be noted that terminals in the state of exception may correspond to a same or different restricted service policies in this embodiment of this application. For example, in the scenario in which the indication information is used to indicate that the terminal is in the state of exception, a restricted service policy corresponding to terminal 1 in the state of exception may be a restricted service policy 1, and a restricted service policy corresponding to terminal 2 in the state of exception may be a restricted service policy 2. In a scenario in which the indication information is used to indicate the exception type of the terminal, restricted service policies corresponding to different exception types of the terminal 1 in the state of exception may be the restricted service policy 1, the restricted service policy 2, and a restricted service policy 3, and restricted service policies corresponding to different exception types of the terminal 2 in the state of exception may be a restricted service policy 1', a restricted service policy 2', and a restricted service policy 3'.

Step 305: An SMF receives the identifier of the terminal and the first restricted service policy.

Step 306: The SMF sends, according to the received first restricted service policy, a restricted service policy corresponding to a communications device to the communications device.

The restricted service policy corresponding to the communications device is sent to the communications device in the step 306, such that the communications device provides the restricted service for the terminal according to the received restricted service policy.

The communications device may be a terminal, an access network device, or a UPF. Alternatively, the communications device may be a terminal and a UPF, or may be an access network device and a UPF. This is not limited herein.

For example, when the first restricted service policy is used to stop an uplink data flow of the terminal, in the step 306, the SMF may send a second restricted service policy to the terminal according to the first restricted service policy, such that the terminal performs a related operation according to the second restricted service policy, for example, stops the uplink data flow of the terminal. For details, refer to the embodiment shown in FIG. 4 or FIG. 7. This is not limited herein.

Alternatively, when the first restricted service policy is used to stop an uplink data flow of the terminal, in the step 306, the SMF may send the identifier of the terminal and a third restricted service policy to an access network device according to the first restricted service policy, such that the access network device provides the restricted service for the terminal based on the identifier of the terminal and the third restricted service policy, for example, stops the uplink data flow of the terminal. For details, refer to the embodiment shown in FIG. 5 or FIG. 8. This is not limited herein.

For example, when the first restricted service policy is used to restrict a downlink data flow of the terminal, in the step 306, the SMF may send the identifier of the terminal and a fourth restricted service policy to the UPF according to the first restricted service policy, such that the UPF provides the restricted service for the terminal based on the identifier of the terminal and the fourth restricted service policy, for example, restricts the downlink data flow of the terminal. For details, refer to the embodiment shown in FIG. 6 or FIG. 9. This is not limited herein.

For example, when the first restricted service policy is used to stop an uplink data flow and restrict a downlink data flow of the terminal, in the step 306, the SMF may send the second restricted service policy to the terminal according to the first restricted service policy, such that the terminal performs a related operation according to the second restricted service policy, for example, stops then uplink data flow of the terminal, and sends the identifier of the terminal and the fourth restricted service policy to the UPF, such that the UPF provides the restricted service for the terminal based on the identifier of the terminal and the fourth restricted service policy, for example, restricts the downlink data flow of the terminal.

Alternatively, when the first restricted service policy is used to stop an uplink data flow and restrict a downlink data flow of the terminal, in the step 306, the SMF may send the identifier of the terminal and the third restricted service policy to the access network device according to the first restricted service policy, such that the access network device provides the restricted service for the terminal based on the identifier of the terminal and the third restricted service policy, for example, stops the uplink data flow of the terminal, and sends the identifier of the terminal and the fourth restricted service policy to the UPF, such that the UPF provides the restricted service for the terminal based on the identifier of the terminal and the fourth restricted service policy, for example, restricts the downlink data flow of the terminal.

It should be noted that the second restricted service policy, the third restricted service policy, and the fourth restricted service policy may be the same as or different from the first restricted service policy. For example, after receiving the identifier of the terminal and the first restricted service policy, the SMF may perform the step 306 without processing the first restricted service policy, but directly send the first restricted service policy to the communications device, such that the communications device provides the restricted service for the terminal according to the first restricted service policy. For another example, in the step 306, the SMF may use policy information that is in the first restricted service policy and that is used by the terminal to stop the uplink data flow as the second restricted policy and send the second restricted policy to the terminal. In this case, the first restricted service policy is different from the second restricted service policy. Alternatively, the SMF may use policy information that is in the first restricted service policy and that is used by the access network device to stop the uplink data flow of the terminal as the third restricted policy and send the third restricted policy to the access network device.

Alternatively, when the first restricted service policy is used to stop an uplink data flow of the terminal, the step 304 may alternatively be as follows: The PCF sends the identifier of the terminal and the first restricted service policy to the AMF according to the indication information. The step 305 may alternatively be as follows: The AMF receives the identifier of the terminal and the first restricted service policy. The step 306 may alternatively be as follows: The AMF sends the restricted service policy corresponding to the communications device to the communications device according to the received first restricted service policy. The restricted service policy corresponding to the communications device is sent to the communications device in the alternative step 306, such that the communications device provides the restricted service for the terminal according to the received restricted service policy. An implementation process in which the AMF sends, according to the received first restricted service policy, the restricted service policy corresponding to the communications device to the communications device is similar to that of the SMF in the step 306. Details are not described herein again.

For example, in the alternative step 306, the AMF may send the second restricted service policy to the terminal according to the received first restricted service policy, such that the terminal performs a related operation according to the second restricted service policy, for example, stops the uplink data flow of the terminal. For details, refer to the embodiment shown in FIG. 10. This is not limited herein. Alternatively, in the alternative step 306, the AMF may send the identifier of the terminal and the third restricted service policy to the access network device according to the received first restricted service policy, such that the access network device provides the restricted service for the terminal based on the identifier of the terminal and the third restricted service policy, for example, stops the uplink data flow of the terminal. For details, refer to the embodiment shown in FIG. 11. This is not limited herein.

The second restricted service policy is used to stop an uplink data flow of the terminal. The third restricted service policy is used to stop an uplink data flow of the terminal. The fourth restricted service policy is used to restrict a downlink data flow of the terminal.

According to the method for providing a restricted service provided in this embodiment of this application, after receiving the identifier of the terminal and the indication information used to indicate that the terminal is in the state of exception or indicate the exception type of the terminal, the PCF sends, according to the indication information, the identifier of the terminal and the first restricted service policy used to provide the restricted service for the terminal, to provide the restricted service for the terminal, instead of directly deregistering the terminal when the terminal is abnormal. This effectively reduces security risks and improves management efficiency of the terminal.

The following describes the method shown in FIG. 3 with reference to the 5G mobile communications system shown in FIG. 1.

Figure 4:
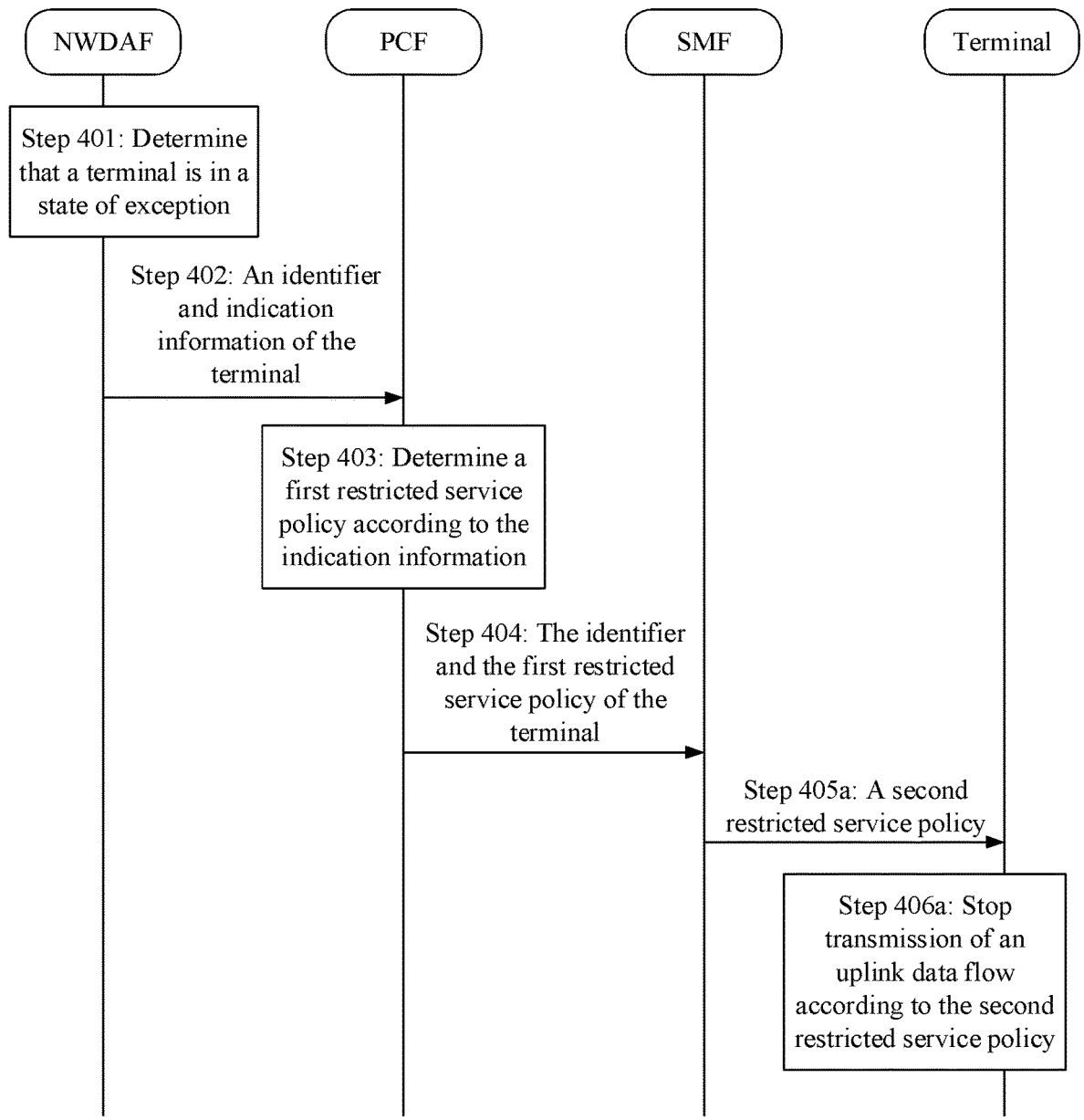
FIG. 4 is a schematic flowchart of a method for providing a restricted service according to another embodiment of this application.
Figure 5:
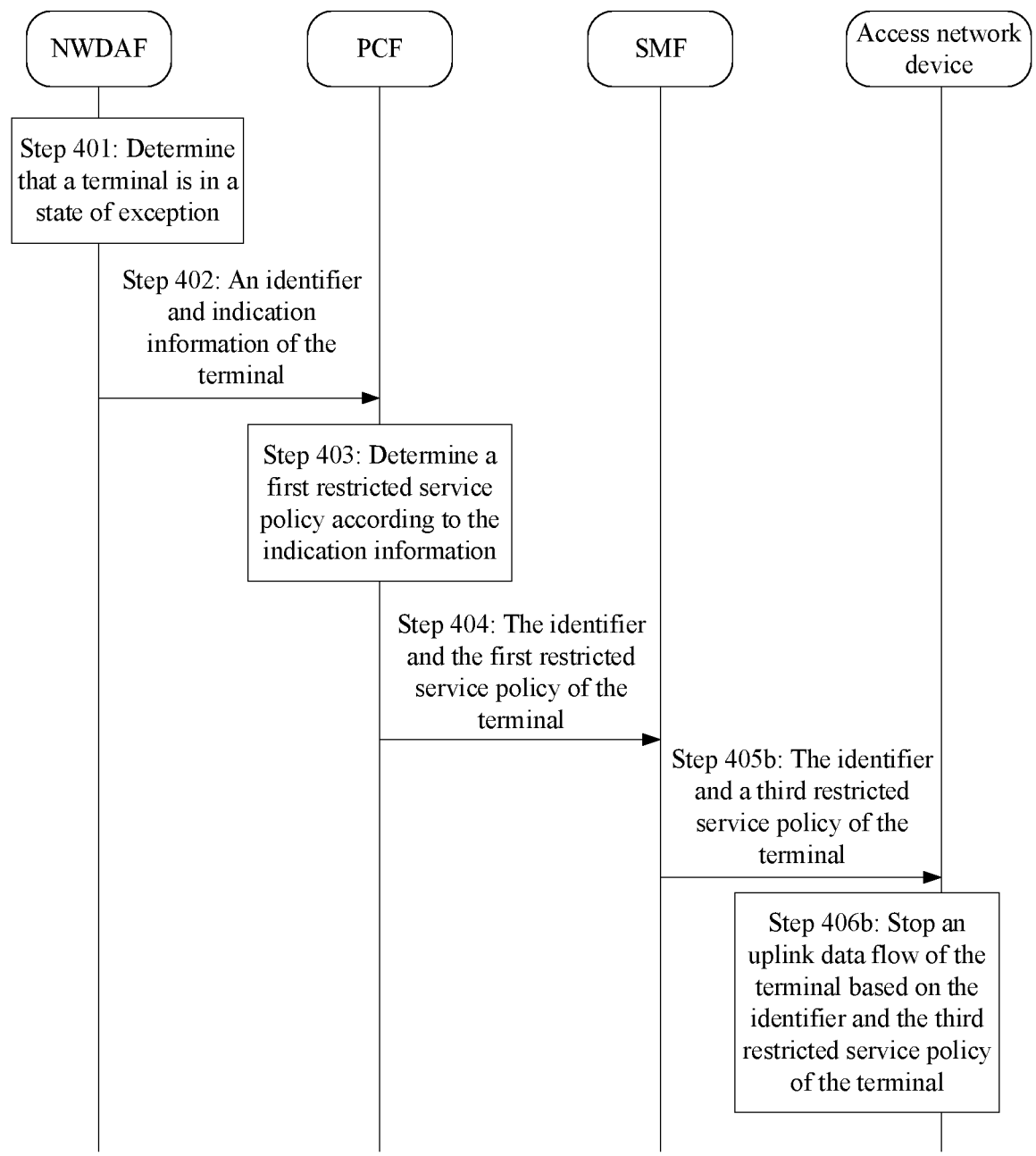
FIG. 5 is a schematic flowchart of another method for providing a restricted service according to another embodiment of this application.
Figure 6:
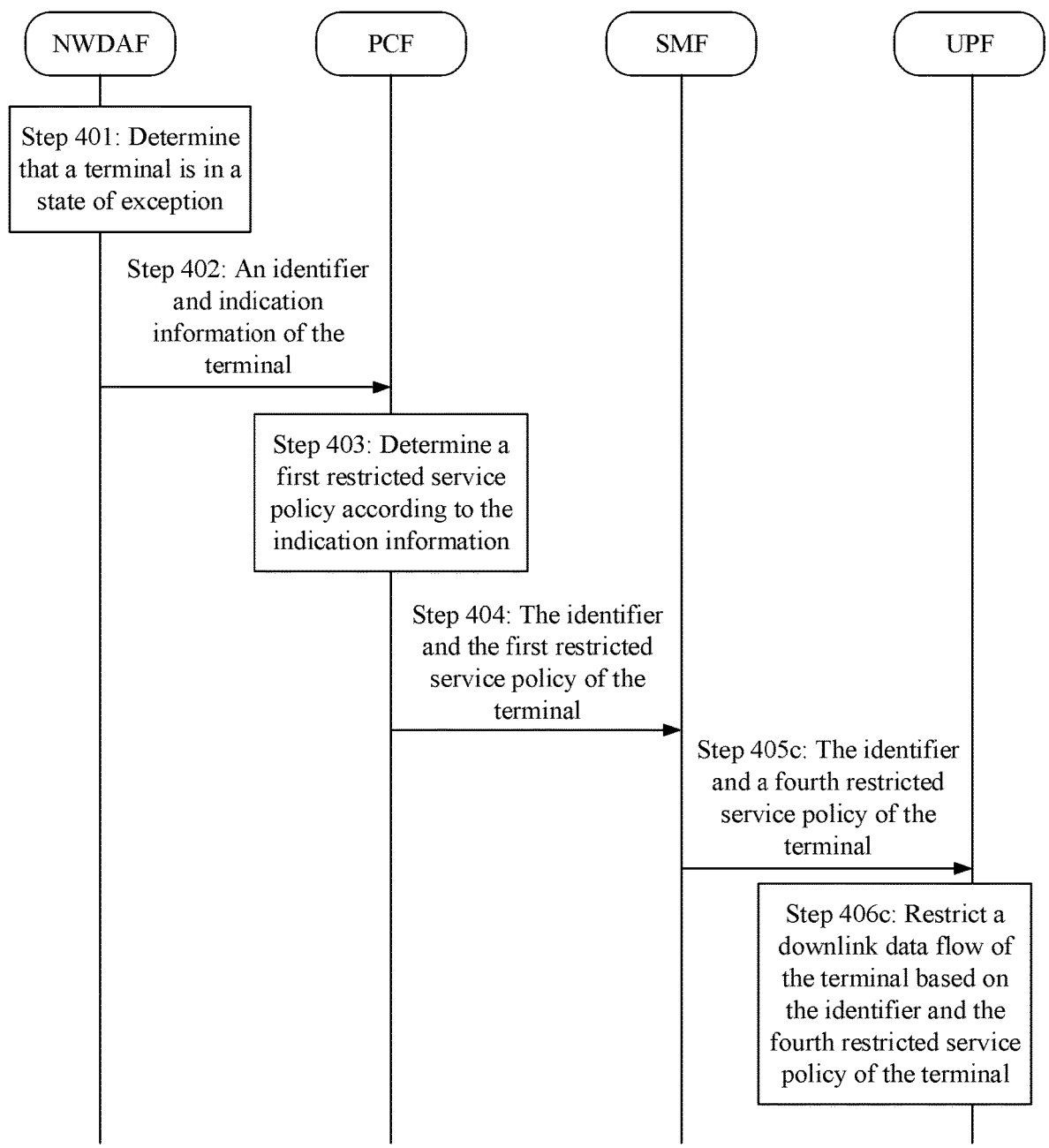
FIG. 6 is a schematic flowchart of still another method for providing a restricted service according to another embodiment of this application.

FIG. 4 to FIG. 6 are schematic flowcharts of a method for providing a restricted service according to another embodiment of this application. In the method provided in the embodiment shown in FIG. 4 to FIG. 6, that a first network element is the NWDAF in FIG. 1 is used as an example. It should be noted that, when the first network element is the AF in FIG. 1, for an execution process of the first network element, refer to the method provided in the embodiment shown in FIG. 4 to FIG. 6. Details are not described herein again. The method may include the following steps.

Step 401: The NWDAF determines that a terminal is in a state of exception.

For an implementation of determining, by the NWDAF, that the terminal is in the state of exception, refer to related descriptions of the step 301 in the embodiment shown in FIG. 3. Details are not described herein again.

Step 402: The NWDAF sends an identifier of the terminal and indication information to a PCF of the terminal.

The indication information is used to indicate that the terminal is in the state of exception or indicate an exception type of the terminal. For descriptions of the indication information, refer to related descriptions of the step 302 in the embodiment shown in FIG. 3. Details are not described herein again.

In a possible implementation, in the step 402, the NWDAF may invoke an Nnwdaf EventsSubscription Notify service to send the identifier of the terminal and the indication information to the PCF. The PCF of the terminal is a PCF that provides a service for the terminal, and may be one or more PCFs. This is not limited herein. A context of the terminal that is stored on the NWDAF includes an address of the PCF that provides the service for the terminal. Further, after receiving the identifier of the terminal and the indication information from the NWDAF, the PCF may send a service response message to the NWDAF. The service response message is used to acknowledge reception of the identifier of the terminal and the indication information that are sent by the NWDAF.

Step 403: The PCF determines a first restricted service policy according to the indication information.

For an implementation of determining, by the PCF, the first restricted service policy according to the indication information, refer to related descriptions of the step 304 in the embodiment shown in FIG. 3. Details are not described herein again.

It may be understood that the first restricted service policy may be used to stop an uplink data flow of the terminal, or used to restrict a downlink data flow of the terminal, or used to stop an uplink data flow and restrict a downlink data flow of the terminal.

Step 404: The PCF sends the identifier of the terminal and the first restricted service policy to an SMF.

In a possible implementation, in the step 404, the PCF may invoke an Npcf_SMPolicyControl_UpdateNotify service to send the identifier of the terminal and the first restricted service policy to the SMF. Further, after receiving the identifier of the terminal and the first restricted service policy from the PCF, the SMF may send a service response message to the PC. The service response message is used to acknowledge reception of the identifier of the terminal and the first restricted service policy that are sent by the PCF.

Optionally, the method further includes: after receiving the identifier of the terminal and the first restricted service policy, the SMF sends, to a communications device according to the received first restricted service policy, a restricted service policy corresponding to the communications device, such that the communications device can provide the restricted service for the terminal according to the received restricted service policy.

For example, as shown in FIG. 4, when the first restricted service policy is used to stop an uplink data flow of the terminal, the method may include the following step 405*a* and step 406*a*. Alternatively, as shown in FIG. 5, when the first restricted service policy is used to stop an uplink data flow of the terminal, the method may include the following step 405*b* and step 406*b*.

For example, as shown in FIG. 6, when the first restricted service policy is used to restrict a downlink data flow of the terminal, the method may include the following step 405*c* and step 406*c*.

For example, when the first restricted service policy is used to stop an uplink data flow and restrict a downlink data flow of the terminal, the method may include the following step 405*a*, step 405*c*, and step 406*c*, or the method may include the following step 405*b*, step 406*b*, step 405*c*, and step 406*c*.

The following describes the step 405*a* and the step 406*a*.

Step 405*a*: The SMF sends a second restricted service policy to the terminal.

The second restricted service policy is used to stop an uplink data flow of the terminal.

In a possible implementation, the second restricted service policy may include a quality of service (QoS) rule (QoS rule). The QoS rule is used to stop an uplink data flow. For example, the QoS rule includes the indication information. The indication information is used to instruct the terminal to set a filter that is of the terminal and that is used to transmit an uplink data packet to invalid.

In a possible implementation, the second restricted service policy in the step 405*a* may be sent by the SMF to the terminal using an AMF and an access network device (for example, an AN/RAN). A message about the second restricted service policy sent by the SMF may be a session management (SM) non-access stratum (NAS) message (SM NAS message). If the SMF sends the second restricted service policy to the terminal using the AMF and the access network device, the SM NAS message may further carry the identifier of the terminal. The identifier is used by the AMF and the access network device to address the terminal.

Step 406*a*: The terminal stops transmission of an uplink data flow according to the second restricted service policy.

The terminal may enter a restricted service state according to the second restricted service policy, in other words, stop transmission of the uplink data flow. In a possible implementation, the terminal may set, according to the indication information in the received QoS rule, the filter that is of the terminal and that is used to transmit the uplink data packet to invalid, to stop transmission of the uplink data flow.

Further, after receiving the second restricted service policy from the SMF, the terminal may further send an acknowledgment message to the SMF. The acknowledgment message is used to acknowledge reception of the second restricted service policy sent by the SMF. For example, the terminal sends an SM NAS acknowledgment (ACK) message to the SMF using the RAN and the AMF.

The following describes the step 405*b* and the step 406*b*.

Step 405*b*: The SMF sends the identifier of the terminal and a third restricted service policy to an access network device.

The third restricted service policy is used to stop an uplink data flow of the terminal.

In a possible implementation, the third restricted service policy may include a QoS configuration file (QoS profile). The QoS configuration file is used to stop an uplink data flow. For example, the QoS configuration file includes the indication information. The indication information is used to instruct the access network device to stop scheduling of an uplink data radio bearer (DRB) resource for the terminal.

In a possible implementation, the identifier of the terminal and the third restricted service policy in the step 405*b* may be sent by the SMF to the access network device using the AMF. A message about the identifier of the terminal and the third restricted service policy that are sent by the SMF may be an SM NAS message.

Step 406*b*: The access network device stops an uplink data flow of the terminal based on the identifier of the terminal and the third restricted service policy.

In a possible implementation, the access network device may determine, based on the identifier of the terminal and the third restricted service policy, to stop scheduling of the uplink DRB resource for the terminal, to stop the uplink data flow of the terminal.

Further, after receiving the identifier of the terminal and the third restricted service policy from the SMF, the access network device may further send an acknowledgment message to the SMF. The acknowledgment message may be used to acknowledge reception of the identifier of the terminal and the third restricted service policy that are sent by the SMF. For example, the access network device sends an SM NAS ACK message to the SMF using the AMF.

The following describes the step 405*c* and the step 406*c*.

Step 405*c*: The SMF sends the identifier of the terminal and a fourth restricted service policy to a UPF.

The fourth restricted service policy is used to restrict a downlink data flow of the terminal. In a possible implementation, the fourth restricted service policy may include QoS information. The QoS information is used to restrict a downlink data flow. For example, the QoS information includes the indication information. The indication information is used to instruct the UPF to send a downlink data flow only of <a port with a certain IP> to the terminal.

In a possible implementation, the SMF may add the identifier of the terminal and the fourth restricted service policy in the step 405*c* to a session modification request message and send the message to the UPF. Further, after receiving the identifier of the terminal and the fourth restricted service policy from the SMF, the UPF may send a response message to the SMF. For example, the response message may be a session modification response message.

Step 406*c*: The UPF restricts a downlink data flow of the terminal based on the identifier of the terminal and the fourth restricted service policy.

In a possible implementation, the UPF may determine, based on the identifier of the terminal and the fourth restricted service policy, to send only a downlink data flow only of <a port with a certain IP> to the terminal, to restrict the downlink data flow of the terminal. For example, <the port with a certain IP> may be an IP address and a port of a maintenance server. In this way, when the terminal is in the state of exception, the maintenance server may deliver data related to a patch or software upgrade to the terminal. This improves management efficiency of the terminal.

According to the method provided in the embodiment shown in FIG. 4 to FIG. 6, when determining that the terminal is in a state of exception, the first network element sends the identifier of the terminal and the indication information used to indicate that the terminal is in the state of exception or indicate the exception type of the terminal to the PCF, such that the PCF determines, according to the indication information, the first restricted service policy used to provide the restricted service for the terminal, and sends the identifier of the terminal and the first restricted service policy to the SMF, the SMF sends, according to the first restricted service policy, the restricted service policy corresponding to the communications device to the communications device, and the communications device provides the restricted service for the terminal. For example, when the first restricted service policy is used to stop an uplink data flow, the SMF may send the second restricted service policy to the terminal, such that the terminal may stop transmission of the uplink data flow according to the second restricted service policy. Alternatively, when the first restricted service policy is used to stop an uplink data flow, the SMF may send the identifier of the terminal and the third restricted service policy to the access network device, such that the access network device may stop, according to the third restricted service policy, scheduling of the uplink DRB resource for the terminal, to stop the uplink data flow of the terminal. Alternatively, when the first restricted service policy is used to restrict a downlink data flow, the SMF may send the identifier of the terminal and the fourth restricted service policy to the UPF, such that the UPF may determine, according to the fourth restricted service policy, to send only the downlink data flow only of <a port with a certain IP> to the terminal, to restrict the downlink data flow of the terminal. In addition, <the port with a certain IP> may be the IP address and the port of the maintenance server, and the maintenance server may deliver the data related to a patch or software upgrade to the terminal, instead of directly deregistering the terminal when the terminal is abnormal. This effectively reduces security risks and improves management efficiency of the terminal.

Figure 7:
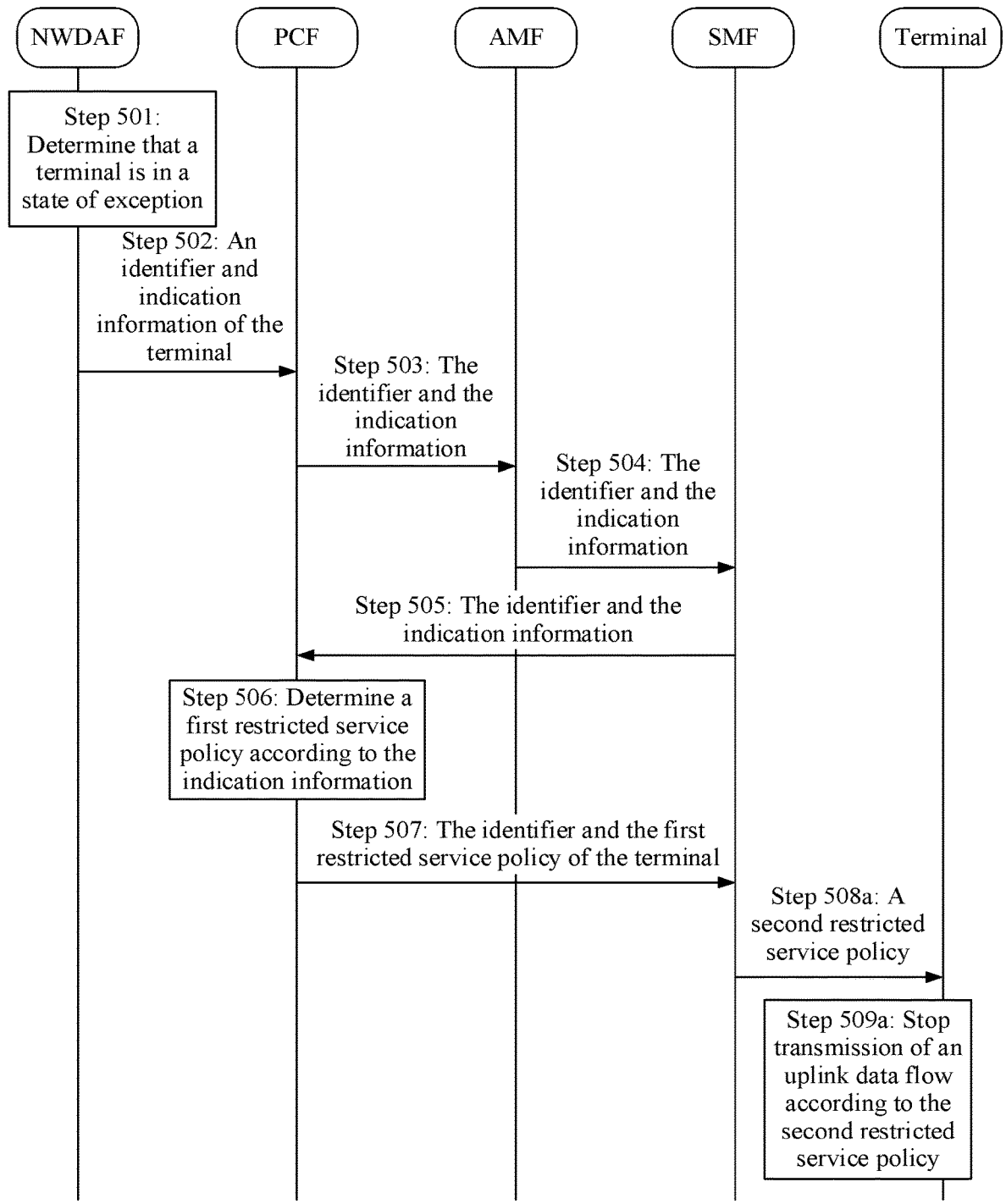
FIG. 7 is a schematic flowchart of still another method for providing a restricted service according to another embodiment of this application.
Figure 8:
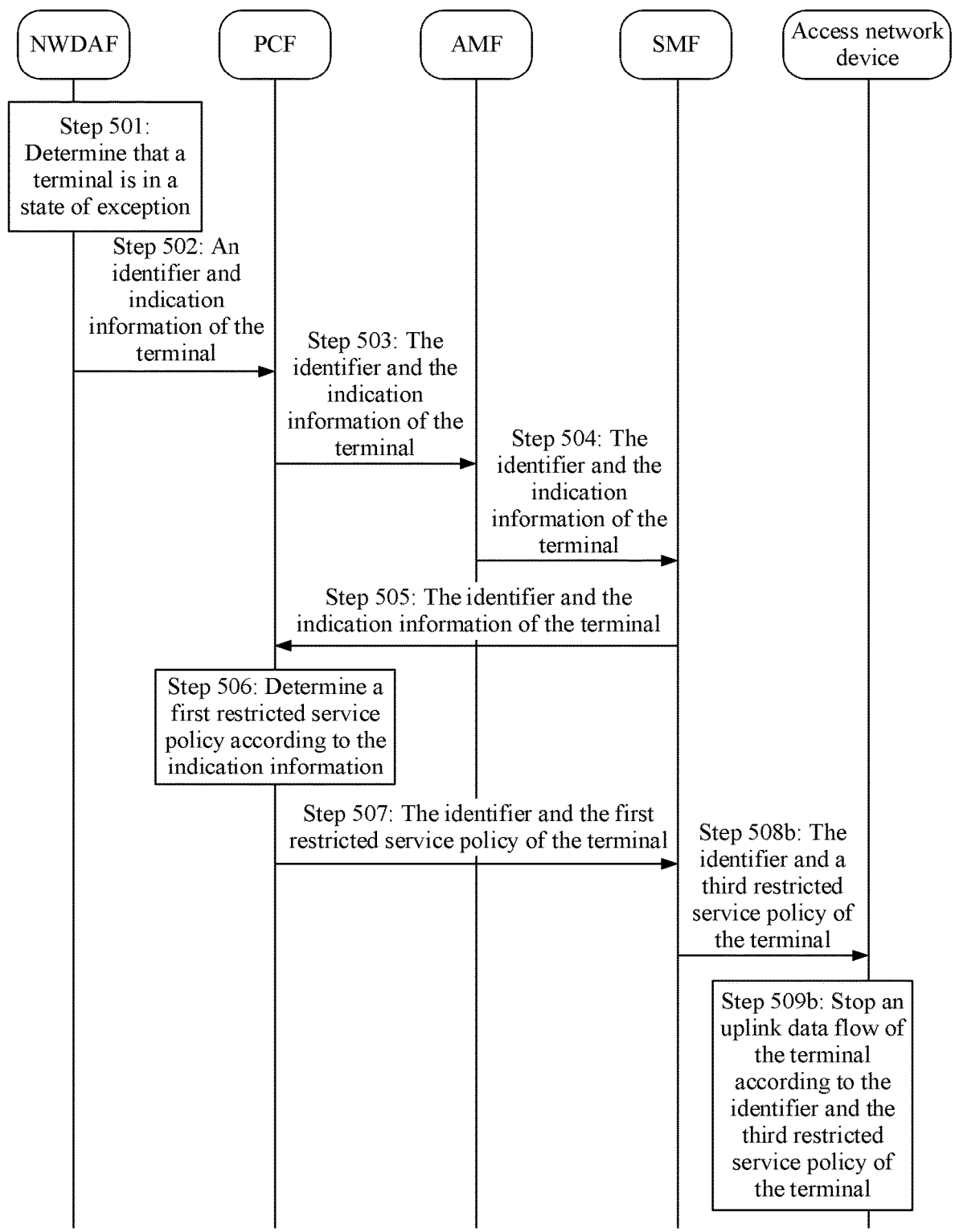
FIG. 8 is a schematic flowchart of still another method for providing a restricted service according to another embodiment of this application.
Figure 9:
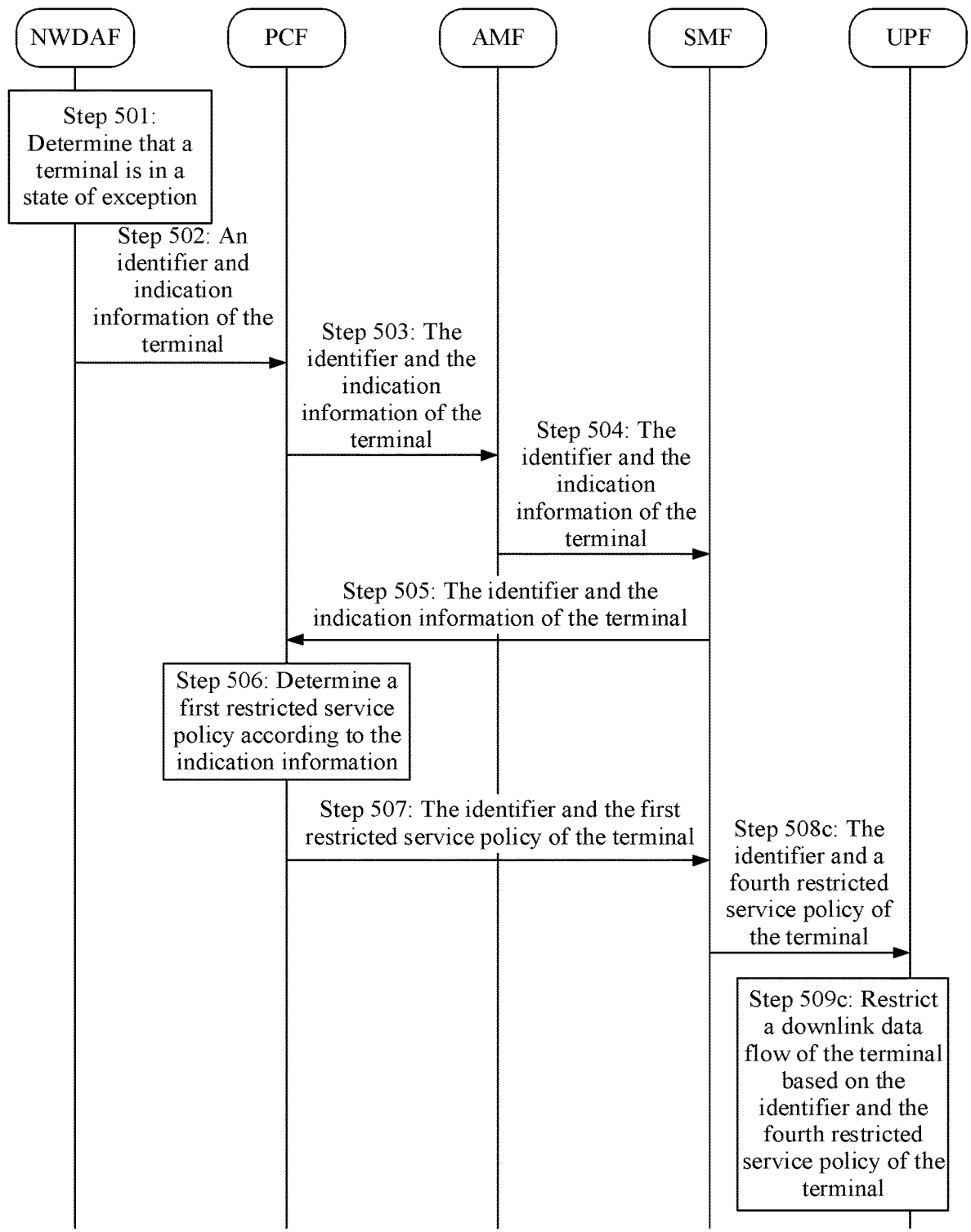
FIG. 9 is a schematic flowchart of still another method for providing a restricted service according to another embodiment of this application.

FIG. 7 to FIG. 9 are schematic flowcharts of a method for providing a restricted service according to another embodiment of this application. In the method provided in the embodiment shown in FIG. 7 to FIG. 9, that a first network element is the NWDAF in FIG. 1 is used as an example. It should be noted that, when the first network element is the AF in FIG. 1, for an execution process of the first network element, refer to the method provided in the embodiment shown in FIG. 7 to FIG. 9. Details are not described herein again. The method may include the following steps.

Step 501: The NWDAF determines that a terminal is in a state of exception.

For an implementation of determining, by the NWDAF, that the terminal is in the state of exception, refer to related descriptions of the step 301 in the embodiment shown in FIG. 3. Details are not described herein again.

Step 502: The NWDAF sends an identifier of the terminal and indication information to a PCF of the terminal.

For descriptions of the step 502, refer to related descriptions of the step 402 in the embodiment shown in FIG. 4 to FIG. 6. Details are not described herein again.

Step 503: The PCF sends the identifier of the terminal and the indication information to an AMF.

In a possible implementation, in the step 503, the PCF may invoke an Npcf_AMPolicyControl_UpdateNotify service to send the identifier of the terminal and the indication information to the AMF. Further, after receiving the identifier of the terminal and the indication information from the PCF, the AMF may send a service response message to the PCF. The service response message is used to acknowledge reception of the identifier of the terminal and the indication information that are sent by the PCF.

Step 504: The AMF sends the identifier of the terminal and the indication information to an SMF of the terminal.

The SMF of the terminal is an SMF that provides a service for the terminal, and may be one or more SMFs. This is not limited herein.

In a possible implementation, in the step 504, the AMF may invoke an Namf_EventExposure_Notify service to send the identifier of the terminal and the indication information to the SMF of the terminal. Further, after receiving the identifier of the terminal and the indication information from the AMF, the SMF of the terminal may send a service response message to the AMF. The service response message is used to acknowledge reception of the identifier of the terminal and the indication information that are sent by the AMF.

To simplify the accompanying drawings, FIG. 7 to FIG. 9 show that the AMF sends the identifier of the terminal and the indication information to only one SMF of the terminal. In addition, for ease of description, the following steps are also described using a procedure as an example in which one SMF of the terminal receives the identifier of the terminal and the indication information that are sent by the AMF. A procedure in which another SMF of the terminal receives the identifier of the terminal and the indication information that are sent by the AMF is the same as the following procedure. Details are not described herein again.

Step 505: The SMF sends the identifier of the terminal and the indication information to the PCF corresponding to the SMF.

In the step 505, the SMF may invoke an Npcf_SMPolicyControl_Update service to send the identifier of the terminal and the indication information to the PCF corresponding to the SMF. In a possible implementation, a context of the terminal that is stored by the SMF includes an address of the PCF corresponding to the SMF.

Step 506: The PCF determines a first restricted service policy according to the indication information.

For an implementation of determining, by the PCF, the first restricted service policy according to the indication information, refer to related descriptions of the step 304 in the embodiment shown in FIG. 3. Details are not described herein again.

It may be understood that the first restricted service policy may be used to stop an uplink data flow of the terminal, or used to restrict a downlink data flow of the terminal, or used to stop an uplink data flow and restrict a downlink data flow of the terminal.

Step 507: The PCF sends the identifier of the terminal and the first restricted service policy to the SMF.

In a possible implementation, if the SMF invokes the Npcf_SMPolicyControl_Update service to send the identifier of the terminal and the indication information to the PCF, correspondingly in the step 507, the PCF may add the identifier of the terminal and the first restricted service policy to a service response message sent to the SMF.

Optionally, the method further includes: after receiving the identifier of the terminal and the first restricted service policy, the SMF may send, according to the received first restricted service policy, the restricted service policy corresponding to a communications device to the communications device, such that the communications device provides a restricted service for the terminal according to the received restricted service policy.

For example, as shown in FIG. 7, when the first restricted service policy is used to stop an uplink data flow of the terminal, the method may include the following step 508a and step 509a. Alternatively, as shown in FIG. 8, when the first restricted service policy is used to stop an uplink data flow of the terminal, the method may include the following step 508b and step 509b.

For example, as shown in FIG. 9, when the first restricted service policy is used to restrict a downlink data flow of the terminal, the method may include the following step 508c and step 509c.

For example, when the first restricted service policy is used to stop an uplink data flow and restrict a downlink data flow of the terminal, the method may include the following step 508a, step 508c, and step 509c, or the method may include the following step 508b, step 509b, step 508c, and step 509c.

The following describes the step 508a and the step 509a.

Step 508a: The SMF sends a second restricted service policy to the terminal.

For descriptions of the step 508a, refer to related descriptions of the step 405a in the embodiment shown in FIG. 4. Details are not described herein again.

Step 509a: The terminal stops transmission of an uplink data flow according to the second restricted service policy.

For descriptions of the step 509a, refer to related descriptions of the step 406a in the embodiment shown in FIG. 4. Details are not described herein again.

Further, after receiving the second restricted service policy from the SMF, the terminal may further send an acknowledgment message to the SMF. The acknowledgment message is used to acknowledge reception of the second restricted service policy sent by the SMF. For example, the terminal sends an SM NAS ACK message to the SMF using a RAN and the AMF.

The following describes the step 508b and the step 509b.

Step 508b: The SMF sends the identifier of the terminal and a third restricted service policy to an access network device.

For descriptions of the step 508b, refer to related descriptions of the step 405b in the embodiment shown in FIG. 5. Details are not described herein again.

Step 509*b*: The access network device stops an uplink data flow of the terminal according to the identifier of the terminal and the third restricted service policy.

For descriptions of the step 509*b*, refer to related descriptions of the step 406*b* in the embodiment shown in FIG. 5. Details are not described herein again.

Further, after receiving the identifier of the terminal and the third restricted service policy from the SMF, the access network device may further send an acknowledgment message to the SMF. The acknowledgment message may be used to acknowledge reception of the identifier of the terminal and the third restricted service policy that are sent by the SMF. For example, the access network device sends an SM NAS ACK message to the SMF using the AMF.

The following describes the step 508*c* and the step 509*c*.

Step 508*c*: The SMF sends the identifier of the terminal and a fourth restricted service policy to a UPF.

For descriptions of the step 508*c*, refer to related descriptions of the step 405*c* in the embodiment shown in FIG. 6. Details are not described herein again.

Step 509*c*: The UPF restricts a downlink data flow of the terminal based on the identifier of the terminal and the fourth restricted service policy.

For descriptions of the step 509*c*, refer to related descriptions of the step 406*c* in the embodiment shown in FIG. 6. Details are not described herein again.

According to the method provided in the embodiment shown in FIG. 7 to FIG. 9, when determining that the terminal is in a state of exception, the first network element sends, to the PCF that provides the service for the terminal, the identifier of the terminal and the indication information used to indicate that the terminal is in the state of exception or indicate an exception type of the terminal, such that the PCF sends the identifier of the terminal and the indication information to the AMF. The AMF sends the identifier of the terminal and the indication information to the SMF of the terminal. The SMF sends the identifier of the terminal and the indication information to the PCF corresponding to the SMF. The PCF determines, according to the received indication information, the first restricted service policy used to provide the restricted service for the terminal, and sends the identifier of the terminal and the first restricted service policy to the SMF. Then, the SMF sends, according to the first restricted service policy, the restricted service policy corresponding to the communications device to the communications device, such that the communications device provides the restricted service for the terminal, instead of directly deregistering the terminal when the terminal is abnormal. This effectively reduces security risks and improves management efficiency of the terminal.

Figure 10:
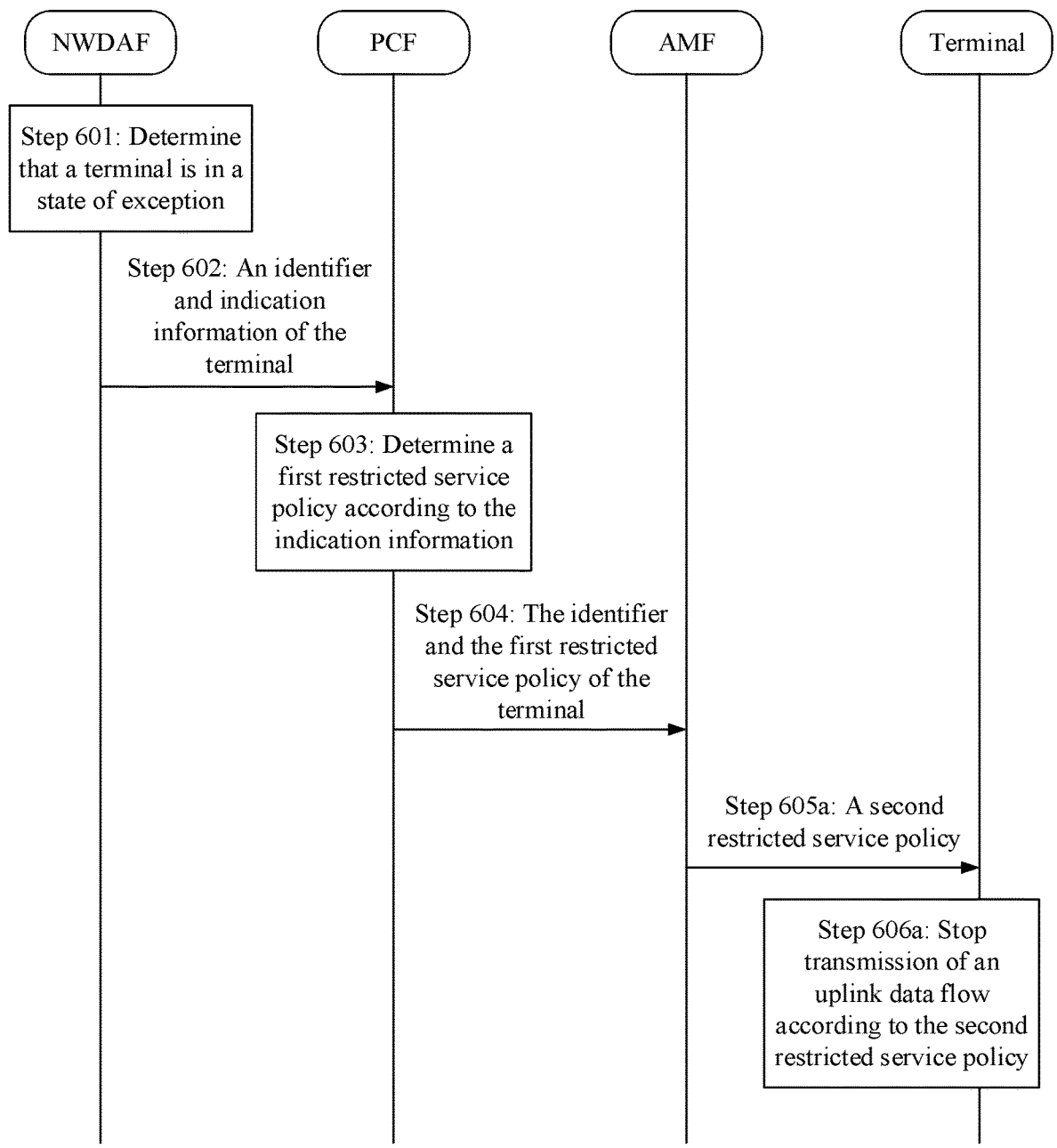
FIG. 10 is a schematic flowchart of still another method for providing a restricted service according to another embodiment of this application.
Figure 11:
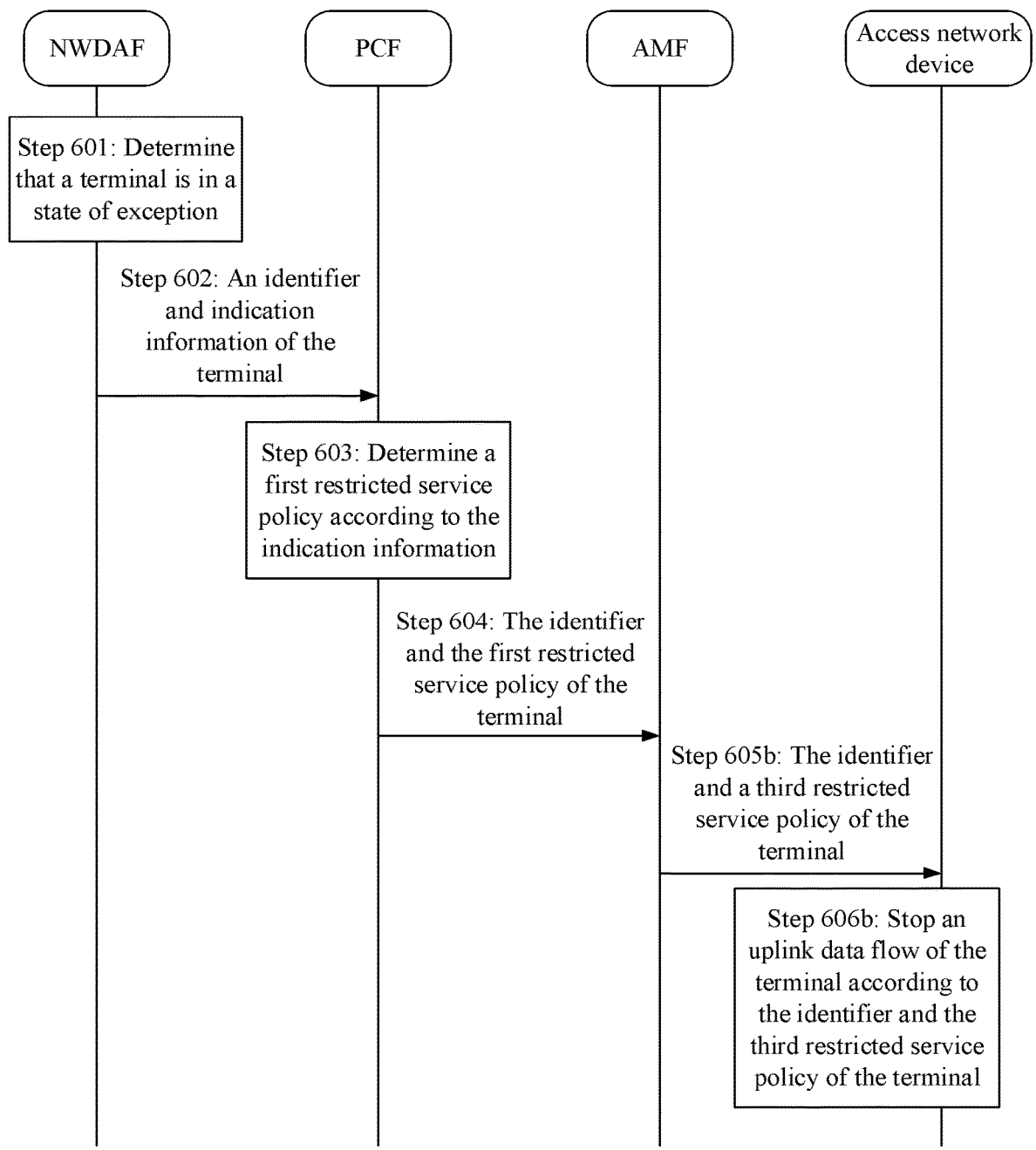
FIG. 11 is a schematic flowchart of still another method for providing a restricted service according to another embodiment of this application.

The method provided in the embodiment shown in FIG. 4 to FIG. 9 is described using an example in which the SMF delivers the restricted service policy to the communications device, such that the communications device provides the restricted service for the terminal. When the restricted service includes stopping an uplink data flow, in an alternative solution, the AMF may deliver the restricted service policy to the communications device, such that the communications device provides the restricted service for the terminal. With reference to FIG. 10 and FIG. 11, the following describes, using an example in which a first network element is an NWDAF, the method provided in the embodiment shown in FIG. 3. The method may include the following steps.

Step 601: The NWDAF determines that a terminal is in a state of exception.

For an implementation of determining, by the NWDAF, that the terminal is in the state of exception, refer to related descriptions of the step 301 in the embodiment shown in FIG. 3. Details are not described herein again.

Step 602: The NWDAF sends an identifier of the terminal and indication information to a PCF.

For descriptions of the step 602, refer to related descriptions of the step 402 in the embodiment shown in FIG. 4 to FIG. 6. Details are not described herein again.

Step 603: The PCF determines a first restricted service policy according to the indication information.

For an implementation of determining, by the PCF, the first restricted service policy according to the indication information, refer to related descriptions of the step 304 in the embodiment shown in FIG. 3. Details are not described herein again. In this embodiment of this application, the first restricted service policy may be used to stop an uplink data flow of the terminal.

Step 604: The PCF sends the identifier of the terminal and the first restricted service policy to an AMF.

In a possible implementation, in the step 604, the PCF may invoke an Npcf_AMPolicyControl_UpdateNotify service to send the identifier of the terminal and the first restricted service policy to the AMF. Further, after receiving the identifier of the terminal and the first restricted service policy from the PCF, the AMF may send a service response message to the PCF. The service response message is used to acknowledge reception of the identifier of the terminal and the first restricted service policy that are sent by the PCF.

Optionally, the method further includes: after receiving the identifier of the terminal and the first restricted service policy, the AMF may send, according to the received first restricted service policy, the restricted service policy corresponding to a communications device to the communications device, such that the communications device provides a restricted service for the terminal according to the received restricted service policy.

For example, as shown in FIG. 10, the method may include the following step 605*a* and step 606*a*. Alternatively, as shown in FIG. 11, the method may include the following step 605*b* and step 606*b*.

The following describes the step 605*a* and the step 606*a*.

Step 605*a*: The AMF sends a second restricted service policy to the terminal.

The second restricted service policy is used to stop an uplink data flow of the terminal. In a possible implementation, the second restricted service policy may include the indication information. The indication information is used to instruct to update or modify a threshold value in a UE route selection policy (URSP) of the terminal to a first value. The first value is used to stop an uplink data flow.

In a possible implementation, the second restricted service policy in the step 605*a* may be sent by the AMF to the terminal using an access network device (for example, an AN/RAN). A message about the second restricted service policy sent by the AMF may be an access and mobility non-access stratum message (AM NAS message). If the AMF sends the second restricted service policy to the terminal using the access network device, the AM NAS message may further carry the identifier of the terminal. The identifier is used by the access network device to address the terminal.

Step 606*a*: The terminal stops transmission of an uplink data flow according to the second restricted service policy.

The terminal may enter a restricted service state according to the second restricted service policy, in other words, stop transmission of the uplink data flow. In a possible implementation, the terminal may update or modify the threshold value in the URSP of the terminal to the first value according to the received indication information, to stop transmission of the uplink data flow.

Further, after receiving the second restricted service policy from the AMF, the terminal may further send an acknowledgment message to the AMF. The acknowledgment message is used to acknowledge reception of the second restricted service policy sent by the AMF. For example, the terminal sends an AM NAS ACK message to the AMF using the RAN.

The following describes the step 605*b* and the step 606*b*.

Step 605*b*: The AMF sends the identifier of the terminal and a third restricted service policy to an access network device.

The third restricted service policy is used to stop an uplink data flow of the terminal. In a possible implementation, the third restricted service policy may include a QoS configuration file. The QoS configuration file is used to stop an uplink data flow. For example, the QoS configuration file includes the indication information. The indication information is used to instruct the access network device to stop scheduling of an uplink DRB resource for the terminal.

In a possible implementation, in the step 605*b*, the AMF may add the identifier of the terminal and the third restricted service policy to a UE context modification request message and send the message to the access network device.

Step 606*b*: The access network device stops an uplink data flow of the terminal according to the identifier of the terminal and the third restricted service policy.

For descriptions of the step 606*b*, refer to related descriptions of the step 406*b* in the embodiment shown in FIG. 5. Details are not described herein again.

Further, after receiving the identifier of the terminal and the third restricted service policy from the AMF, the access network device may further send an acknowledgment message to the AMF. The acknowledgment message may be used to acknowledge reception of the identifier of the terminal and the third restricted service policy that are sent by the AMF. For example, the acknowledgment message may be a UE context modification response message.

In an alternative solution, when the first network element is an AF, the step 601 may alternatively be as follows: The AF determines that the terminal is in the state of exception. Step 602 may alternatively be as follows: The AF sends the identifier of the terminal and the indication information to a UDM. The AF may send the identifier of the terminal and the indication information to the UDM using an NEF. Step 603 may alternatively be as follows: The UDM determines the first restricted service policy according to the indication information. Step 604 may alternatively be as follows: The UDM sends the identifier of the terminal and the first restricted service policy to an AMF. For other descriptions, refer to related descriptions of the embodiment shown in FIG. 10 and FIG. 11. Details are not described herein again.

According to the method provided in the embodiment shown in FIG. 10 and FIG. 11, when determining that the terminal is in a state of exception, the NWDAF sends, the identifier of the terminal and the indication information used to indicate that the terminal is in the state of exception or indicate the exception type of the terminal to the PCF, such that the PCF determines, according to the received indication information, the first restricted service policy used to provide the restricted service for the terminal, and sends the identifier of the terminal and the first restricted service policy to the AMF, the AMF sends, according to the first restricted service policy, the restricted service policy corresponding to the communications device to the communications device, and the communications device provides the restricted service for the terminal, instead of directly deregistering the terminal when the terminal is abnormal. This effectively reduces security risks and improves management efficiency of the terminal.

The method provided in the embodiment shown in FIG. 3 to FIG. 11 is mainly described using an example in which the PCF determines and delivers the restricted service policy of the terminal, such that the communications device provides the restricted service for the terminal. In an alternative solution, the AF may alternatively determine and deliver the restricted service policy of the terminal, such that the communications device provides the restricted service for the terminal. With reference to the 5G mobile communications system shown in FIG. 1, the following embodiment describes a method for determining and delivering a restricted service policy of a terminal by an AF to provide a restricted service for the terminal.

Figure 12:
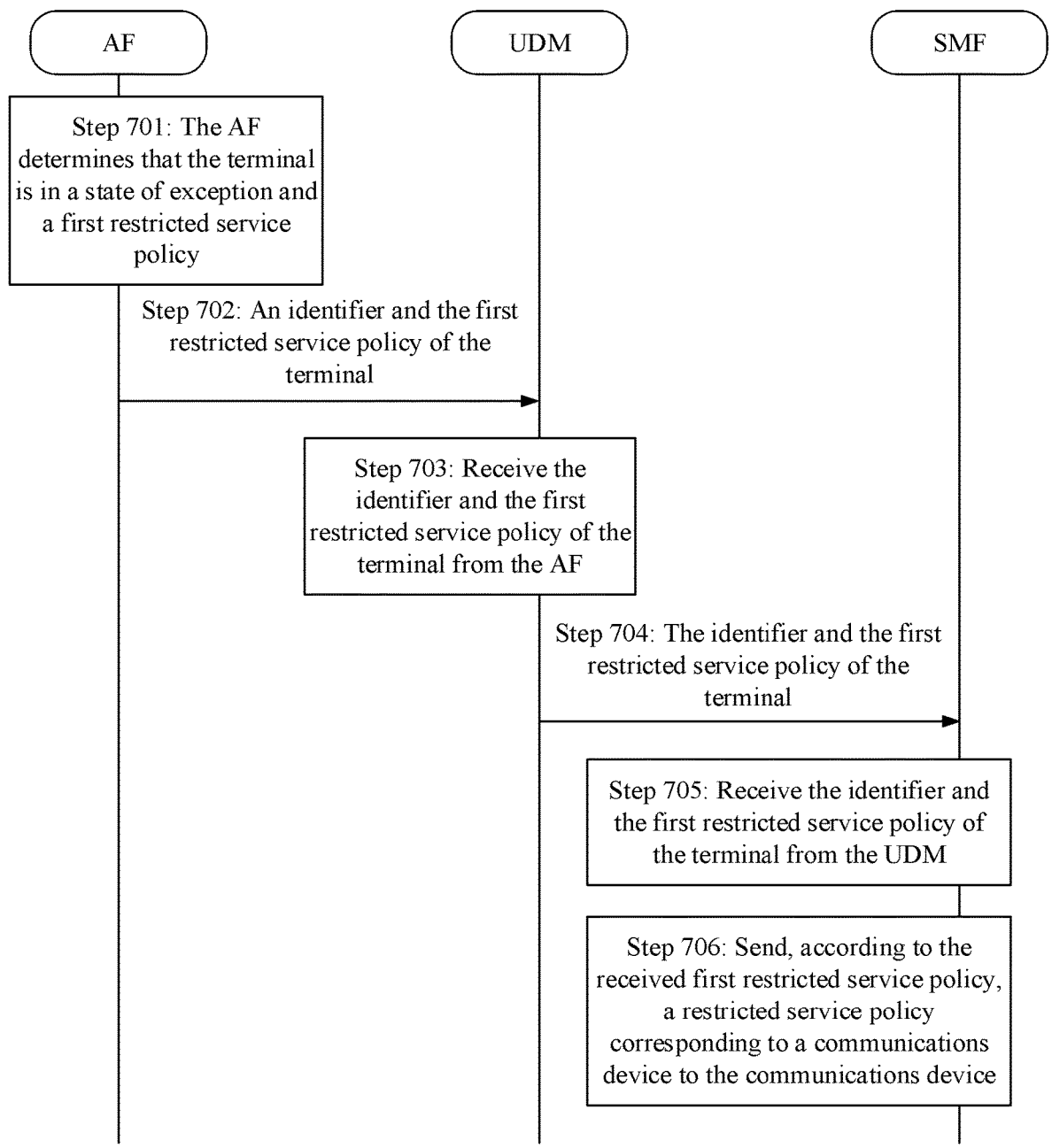
FIG. 12 is a schematic flowchart of still another method for providing a restricted service according to another embodiment of this application.

FIG. 12 is a schematic flowchart of a method for providing a restricted service according to another embodiment of this application. The method may include the following steps.

Step 701: The AF determines that the terminal is in a state of exception and a first restricted service policy.

The first restricted service policy may be a restricted service policy corresponding to an exception of the terminal. The first restricted service policy is used to provide a restricted service for the terminal. The restricted service may include any one of the following: stopping an uplink data flow; restricting a downlink data flow; or stopping an uplink data flow and restricting a downlink data flow. The first restricted service policy may be stopping an uplink data flow of the terminal, or may be restricting a downlink data flow of the terminal, or may be stopping an uplink data flow and restricting a downlink data flow of the terminal.

In the step 701, that the AF determines that the terminal is in the state of exception may alternatively be as follows: The AF determines, based on traffic information of the terminal, that the terminal is in the state of exception. "The terminal is in the state of exception" may also be referred to as "terminal traffic is abnormal."

Alternatively, that the AF determines that the terminal is in a state of exception in the step 701 may alternatively be as follows: The AF determines an exception type of the terminal, or the AF determines an exception type of the terminal based on traffic information of the terminal. The exception type may include any one of the following: abnormal uplink traffic; abnormal downlink traffic; and abnormal uplink traffic and abnormal downlink traffic. The exception type of the terminal may be a traffic exception type of the terminal. In this case, the first restricted service policy may also be referred to as a restricted service policy corresponding to the exception type of the terminal.

It should be noted that, for an implementation of determining, by the AF based on the traffic information of the terminal, that the terminal is in the state of exception, refer to related descriptions of determining, by the first network element based on the traffic information of the terminal, that the terminal is in the state of exception in the step 301 included in the method provided in the embodiment shown in FIG. 3. For an implementation of determining the exception type of the terminal by the AF, refer to related descriptions of determining the exception type of the terminal by the first network element in the step 301 included in the method provided in the embodiment shown in FIG. 3. Details are not described herein again.

For example, if the alternative step (in which the AF determines, based on traffic information of the terminal, that the terminal is in the state of exception) but not the step 701 (in which the AF determines that the terminal is in the state of exception) is performed, in this embodiment of this application, that the AF determines the first restricted service policy in the step 701 may alternatively be as follows: The AF may store the restricted service policy corresponding to the exception of the terminal, namely, the first restricted service policy. The first restricted service policy may be stopping an uplink data flow of the terminal, or may be restricting a downlink data flow of the terminal, or may be stopping an uplink data flow and restricting a downlink data flow of the terminal. The first restricted service policy stored on the AF may be predefined, or may be preconfigured on the AF, or may be delivered by another communications device to the AF. This is not specifically limited in this embodiment of this application. Alternatively, the AF may store a correspondence between an exception and a restricted service policy, and the AF determines, based on the correspondence between an exception and a restricted service policy, the restricted service policy corresponding to the exception of the terminal as the first restricted service policy.

For example, if the alternative step (the AF determines an exception type of the terminal) or (in which the AF determines an exception type of the terminal based on traffic information of the terminal) but not the step 701 (in which the AF determines that the terminal is in the state of exception) is performed, the AF may store a mapping relationship between an exception type and a restricted service policy, as shown in Table 2. In this embodiment of this application, that the AF determines a first restricted service policy in the step 701 may alternatively be as follows: The AF determines, based on the mapping relationship shown in Table 2, the restricted service policy corresponding to the exception type as the first restricted service policy.

TABLE 2

| Abnormality type | Restricted service policy |
| --- | --- |
| Abnormal uplink traffic | Stopping an uplink data flow of the terminal |
| Abnormal downlink traffic | Restricting a downlink data flow of the terminal |
| Abnormal uplink traffic and abnormal downlink traffic | Stopping an uplink data flow and restricting a downlink data flow of the terminal |

With reference to Table 2, when the exception type is abnormal uplink traffic, the first restricted service policy is stopping an uplink data flow of the terminal. When the exception type is abnormal downlink traffic, the first restricted service policy is restricting a downlink data flow of the terminal. When the exception type is abnormal uplink traffic and abnormal downlink traffic, the first restricted service policy is stopping an uplink data flow and restricting a downlink data flow of the terminal.

Step 702: The AF sends an identifier of the terminal and the first restricted service policy to a UDM.

Step 703: The UDM receives the identifier of the terminal and the first restricted service policy from the AF.

Step 704: The UDM sends the identifier of the terminal and the first restricted service policy to an SMF.

In a possible implementation, in the step 704, the UDM may directly send the identifier of the terminal and the first restricted service policy to the SMF. For details, refer to any embodiment shown in FIG. 13 to FIG. 15. This is not limited herein.

In another possible implementation, in the step 704, the UDM may alternatively send the identifier of the terminal and the first restricted service policy to the SMF using an AMF. For details, refer to any embodiment shown in FIG. 16 to FIG. 18. This is not limited herein.

Step 705: The SMF receives the identifier of the terminal and the first restricted service policy from the UDM.

Step 706: The SMF sends, according to the received first restricted service policy, a restricted service policy corresponding to a communications device to the communications device.

For the step 706, refer to the related descriptions of the embodiment shown in FIG. 3. In the step 706, the SMF sends the restricted service policy corresponding to the communications device to the communications device, such that the communications device provides the restricted service for the terminal according to the received restricted service policy.

The communications device may be a terminal, an access network device, or a UPF.

Alternatively, the communications device may be a terminal and a UPF, or may be an access network device and a UPF. This is not limited herein. For example, when the first restricted service policy is used to stop an uplink data flow of the terminal, in the step 706, the SMF may send a second restricted service policy to the terminal according to the first restricted service policy, such that the terminal performs a related operation according to the second restricted service policy, for example, stops the uplink data flow of the terminal. For details, refer to the embodiment shown in FIG. 13 or FIG. 16. This is not limited herein. Alternatively, when the first restricted service policy is used to stop an uplink data flow of the terminal, in the step 706, the SMF may send the identifier of the terminal and a third restricted service policy to an access network device according to the first restricted service policy, such that the access network device provides the restricted service for the terminal based on the identifier of the terminal and the third restricted service policy, for example, stops the uplink data flow of the terminal. For details, refer to the embodiment shown in FIG. 14 or FIG. 17. This is not limited herein.

For example, when the first restricted service policy is used to restrict a downlink data flow of the terminal, in the step 706, the SMF may send the identifier of the terminal and a fourth restricted service policy to the UPF according to the first restricted service policy, such that the UPF provides the restricted service for the terminal based on the identifier of the terminal and the fourth restricted service policy, for example, restricts the downlink data flow of the terminal. For details, refer to the embodiment shown in FIG. 15 or FIG. 18. This is not limited herein.

For example, when the first restricted service policy is used to stop an uplink data flow and restrict a downlink data flow of the terminal, in the step 706, the SMF may send the second restricted service policy to the terminal according to the first restricted service policy, such that the terminal performs a related operation according to the second restricted service policy, for example, stops then uplink data flow of the terminal, and sends the identifier of the terminal and the fourth restricted service policy to the UPF, such that the UPF provides the restricted service for the terminal based on the identifier of the terminal and the fourth restricted service policy, for example, restricts the downlink data flow of the terminal. Alternatively, when the first restricted service policy is used to stop an uplink data flow and restrict a downlink data flow of the terminal, in the step 706, the SMF may send the identifier of the terminal and the third restricted service policy to the access network device according to the first restricted service policy. As such, the access network device provides the restricted service for the terminal based on the identifier of the terminal and the third restricted service policy, for example, stops the uplink data flow of the terminal, and sends the identifier of the terminal and the fourth restricted service policy to the UPF, such that the UPF provides the restricted service for the terminal based on the identifier of the terminal and the fourth restricted service policy, for example, restricts the downlink data flow of the terminal.

The second restricted service policy is used to stop an uplink data flow of the terminal. The third restricted service policy is used to stop an uplink data flow of the terminal. The fourth restricted service policy is used to restrict a downlink data flow of the terminal.

According to the method for providing a restricted service provided in this embodiment of this application, when determining that the terminal is in a state of exception, the AF determines the first restricted service policy used to provide the restricted service for the terminal, and sends the identifier of the terminal and the first restricted service policy to the UDM. As such, the UDM sends the identifier of the terminal and the first restricted service policy to the SMF, to provide the restricted service for the terminal, instead of directly deregistering the terminal when the terminal is abnormal. This effectively reduces security risks and improves management efficiency of the terminal.

The following describes the method shown in FIG. 12 with reference to the 5G mobile communications system shown in FIG. 1.

Figure 13:
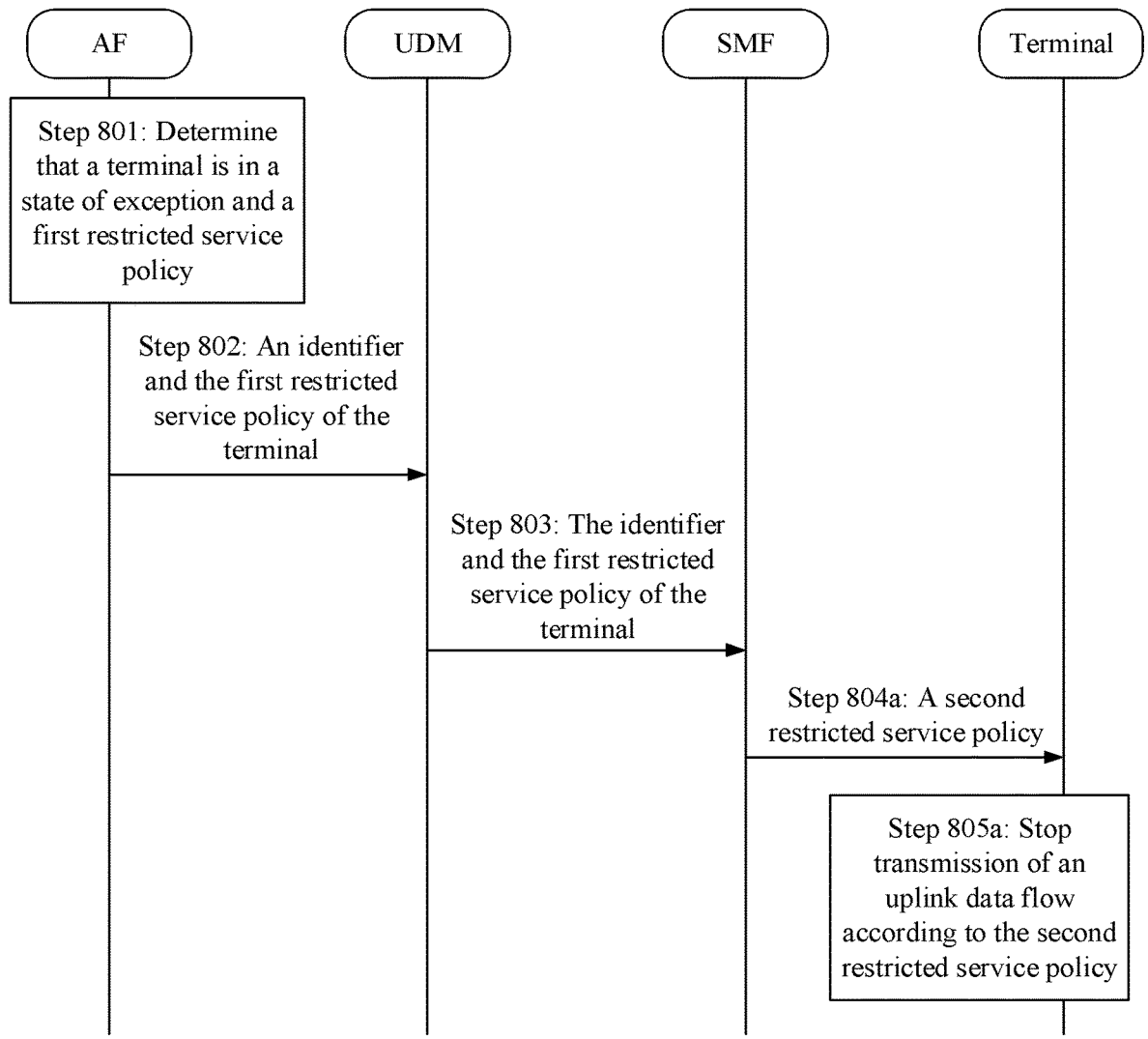
FIG. 13 is a schematic flowchart of still another method for providing a restricted service according to another embodiment of this application.
Figure 14:
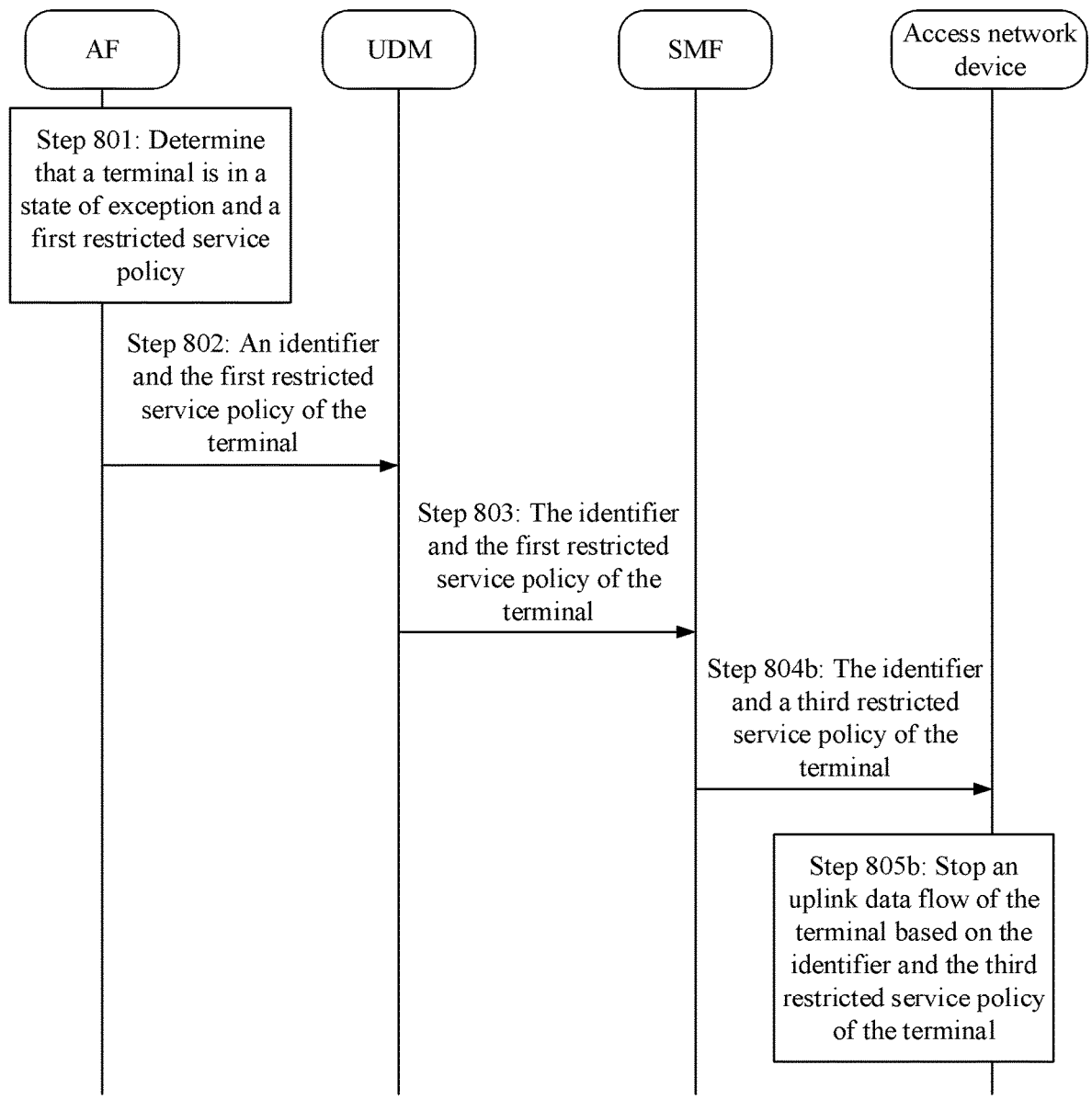
FIG. 14 is a schematic flowchart of still another method for providing a restricted service according to another embodiment of this application.
Figure 15:
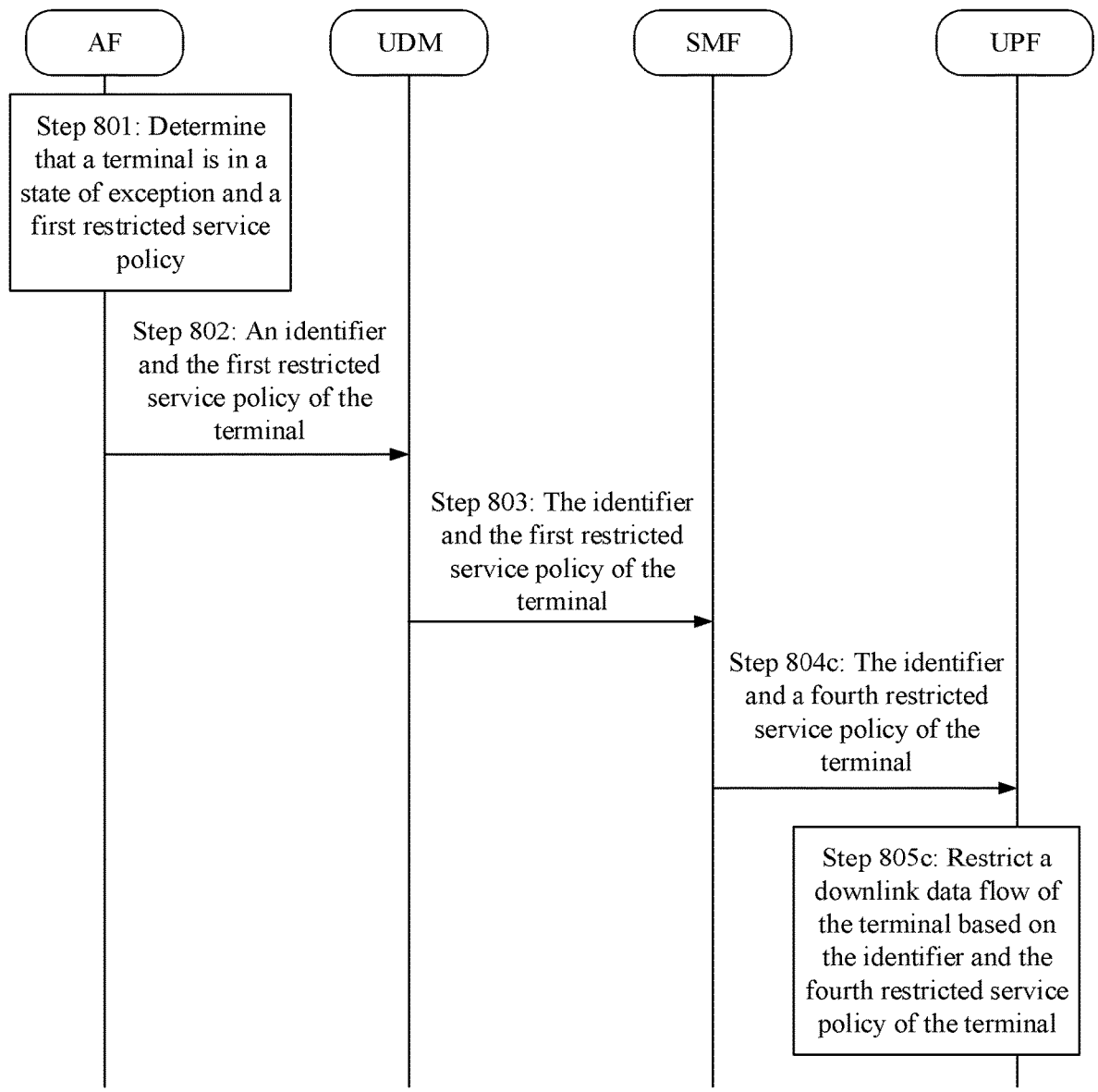
FIG. 15 is a schematic flowchart of still another method for providing a restricted service according to another embodiment of this application.

FIG. 13 to FIG. 15 are schematic flowcharts of a method for providing a restricted service according to another embodiment of this application. The method may include the following steps.

Step 801: An AF determines that a terminal is in a state of exception and a first restricted service policy.

For an implementation of determining, by the AF, that a terminal is in the state of exception and a first restricted service policy, refer to related descriptions of the step 701 in the embodiment shown in FIG. 12. Details are not described herein again.

Step 802: The AF sends an identifier of the terminal and the first restricted service policy to a UDM.

In a possible implementation, in the step 802, the AF may send the identifier of the terminal and the first restricted service policy to the UDM using an NEF. For example, the AF sends an AF traffic steering request message to the NEF. The AF traffic steering request message includes the identifier of the terminal and the first restricted service policy. The NEF sends an update request to the UDM. The updated request includes the identifier of the terminal and the first restricted service policy. Further, after receiving the AF traffic steering request message from the AF, the NEF may return an AF traffic steering response (AF traffic steering response message) to the AF. Further, after receiving the updated request from the NEF, the UDM may send an updated response message to the NEF.

Step 803: The UDM sends the identifier of the terminal and the first restricted service policy to an SMF.

In a possible implementation, in the step 803, the UDM may invoke an Nudm_SDM_Notification service to send the identifier of the terminal and the first restricted service policy to the SMF. Further, after receiving the identifier of the terminal and the first restricted service policy from the UDM, the SMF may send a service response message to the UDM. The service response message is used to acknowledge reception of the identifier of the terminal and the first restricted service policy that are sent by the UDM.

Optionally, the method further includes: after receiving the identifier of the terminal and the first restricted service policy, the SMF may deliver, according to the first restricted service policy, the restricted service policy corresponding to a communications device to the communications device. As such, the communications device provides a restricted service for the terminal according to the received restricted service policy.

For example, as shown in FIG. 13, when the first restricted service policy is used to stop an uplink data flow of the terminal, the method may include the following step 804a and step 805a. Alternatively, as shown in FIG. 14, when the first restricted service policy is used to stop an uplink data flow of the terminal, the method may include the following step 804b and step 805b.

For example, as shown in FIG. 15, when the first restricted service policy is used to restrict a downlink data flow of the terminal, the method may include the following step 804c and step 805c.

For example, when the first restricted service policy is used to stop an uplink data flow and restrict a downlink data flow of the terminal, the method may include the following step 804a, step 804c, and step 805c, or the method may include the following step 804b, step 805b, step 804c, and step 805c.

Further, after receiving the identifier of the terminal and the first restricted service policy, the SMF may alternatively send the identifier of the terminal and the first restricted service policy to a PCF corresponding to the SMF, such that the PCF determines whether to modify the first restricted service policy. If the PCF does not need to modify the first restricted service policy, the PCF may send the identifier of the terminal and the first restricted service policy to the SMF. If the PCF needs to modify the first restricted service policy, the PCF may send a modified restricted service policy to the SMF, such that the SMF delivers, according to the modified restricted service policy, the restricted service policy corresponding to the communications device to the communications device, to provide the restricted service for the terminal. For descriptions of delivering, by the SMF according to the modified restricted service policy, the restricted service policy corresponding to the communications device to the communications device, refer to related descriptions of delivering, according to the first restricted service policy, the restricted service policy corresponding to the communications device to the communications device. Details are not described herein again.

The following describes the step 804a and the step 805a.

Step 804a: The SMF sends a second restricted service policy to the terminal.

For descriptions of the step 804a, refer to related descriptions of the step 405a in the method provided in the embodiment shown in FIG. 4. Details are not described herein again.

Step 805a: The terminal stops transmission of an uplink data flow according to the second restricted service policy.

For descriptions of the step 805a, refer to related descriptions of the step 406a in the method provided in the embodiment shown in FIG. 4. Details are not described herein again.

Further, after receiving the second restricted service policy from the SMF, the terminal may further send an acknowledgment message to the SMF. The acknowledgment message is used to acknowledge reception of the second restricted service policy sent by the SMF. For example, the terminal sends an SM NAS ACK message to the SMF using a RAN and an AMF.

The following describes the step 804b and the step 805b.

Step 804b: The SMF sends the identifier of the terminal and the third restricted service policy to an access network device.

For descriptions of the step 804b, refer to related descriptions of the step 405b in the method provided in the embodiment shown in FIG. 5. Details are not described herein again.

Step 805b: The access network device stops an uplink data flow of the terminal based on the identifier of the terminal and the third restricted service policy.

For descriptions of step 805b, refer to related descriptions of the step 406b in the method provided in the embodiment shown in FIG. 5. Details are not described herein again.

Further, after receiving the identifier of the terminal and the third restricted service policy from the SMF, the access network device may further send an acknowledgment message to the SMF. The acknowledgment message may be used to acknowledge reception of the identifier of the terminal and the third restricted service policy that are sent by the SMF. For example, the access network device sends an SM NAS ACK message to the SMF using the AMF.

The following describes the step 804c and the step 805c.

Step 804c: The SMF sends the identifier of the terminal and a fourth restricted service policy to a UPF.

For descriptions of the step 804c, refer to related descriptions of the step 405c in the method provided in the embodiment shown in FIG. 6. Details are not described herein again.

Step 805c: The UPF restricts a downlink data flow of the terminal based on the identifier of the terminal and the fourth restricted service policy.

For descriptions of the step 805c, refer to related descriptions of the step 406c in the method provided in the embodiment shown in FIG. 6. Details are not described herein again.

According to the method provided in the embodiment shown in FIG. 13 to FIG. 15, when determining that the terminal is in a state of exception, the AF determines the first restricted service policy that corresponds to an exception of the terminal and that is used to provide the restricted service for the terminal, and sends the identifier of the terminal and the first restricted service policy to the UDM. As such, the UDM sends the identifier of the terminal and the first restricted service policy to the SMF, the SMF sends, according to the first restricted service policy, the restricted service policy corresponding to the communications device to the communications device, and the communications device provides the restricted service for the terminal instead, instead of directly deregistering the terminal when the terminal is abnormal. This effectively reduces security risks and improves management efficiency of the terminal.

Figure 16:
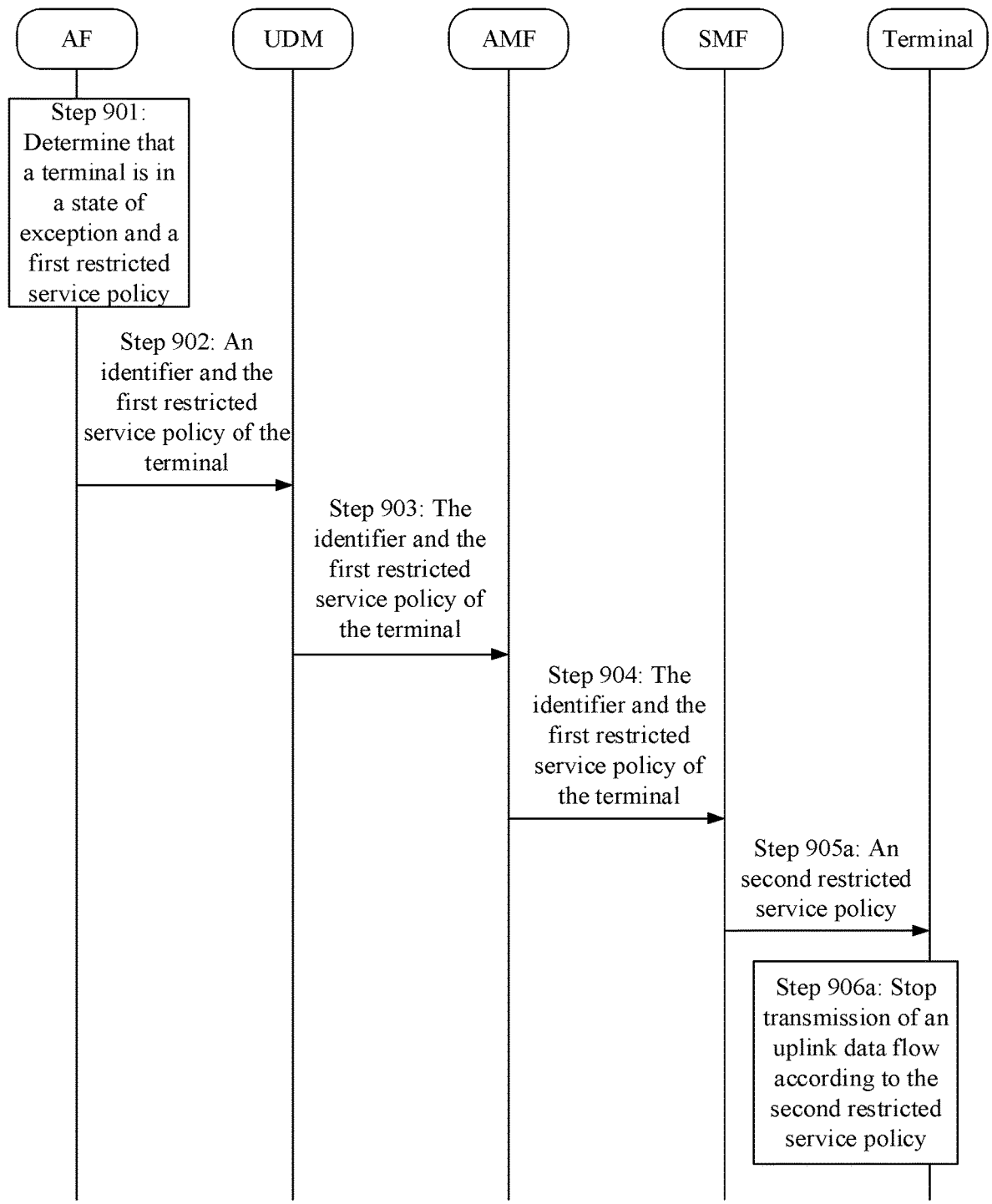
FIG. 16 is a schematic flowchart of still another method for providing a restricted service according to another embodiment of this application.
Figure 17:
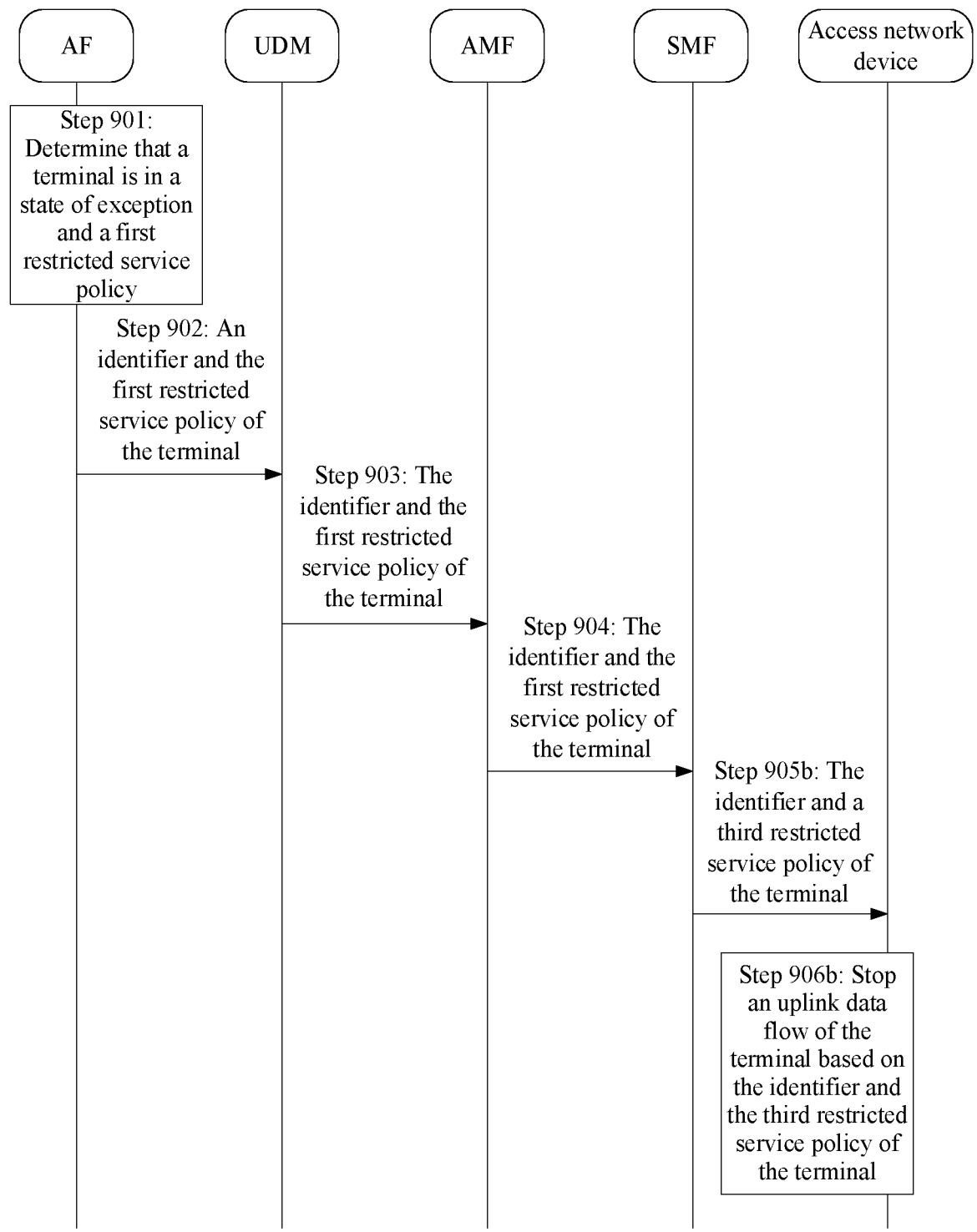
FIG. 17 is a schematic flowchart of still another method for providing a restricted service according to another embodiment of this application.
Figure 18:
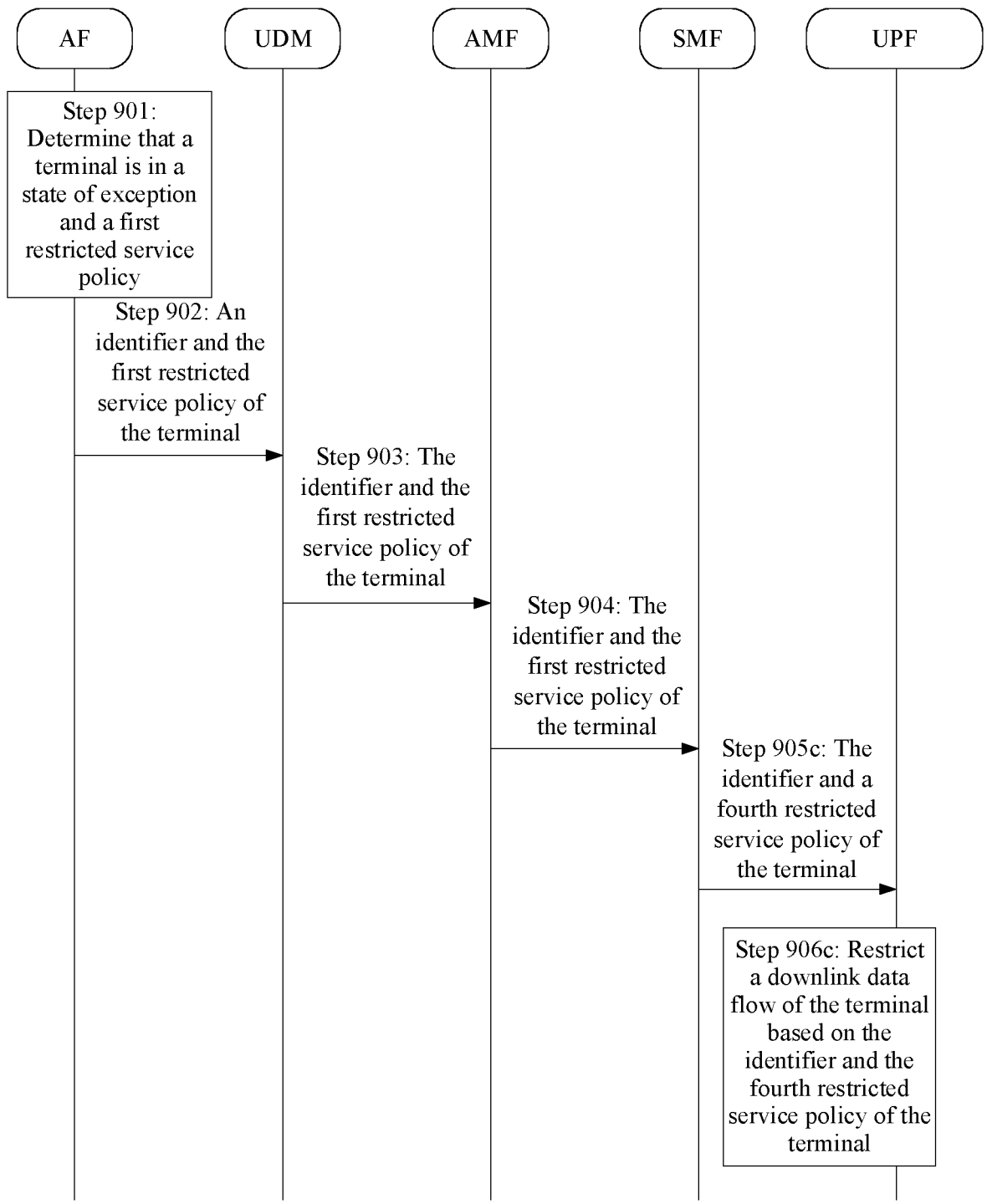
FIG. 18 is a schematic flowchart of still another method for providing a restricted service according to another embodiment of this application.

FIG. 16 to FIG. 18 are schematic flowcharts of a method for providing a restricted service according to another embodiment of this application. The method may include the following steps.

Step 901: An AF determines that a terminal is in a state of exception and a first restricted service policy.

For an implementation of determining, by the AF, that the terminal is in the state of exception and the first restricted service policy, refer to related descriptions of the step 701 in the embodiment shown in FIG. 12. Details are not described herein again.

Step 902: The AF sends an identifier of the terminal and the first restricted service policy to a UDM.

For descriptions of the step 902, refer to related descriptions of the step 802 in the method provided in the embodiment shown in FIG. 13 to FIG. 15. Details are not described herein again.

Step 903: The UDM sends the identifier of the terminal and the first restricted service policy to an AMF.

In a possible implementation, in the step 903, the UDM may invoke an Nudm_SubscriberData_UpdateNotification service to send the identifier of the terminal and the first restricted service policy to the AMF. Further, after receiving the identifier of the terminal and the first restricted service policy from the UDM, the AMF may send a service response message to the UDM. The service response message is used to acknowledge reception of the identifier of the terminal and the first restricted service policy that are sent by the UDM.

Step 904: The AMF sends the identifier of the terminal and the first restricted service policy to an SMF of the terminal.

The SMF of the terminal is an SMF that provides a service for the terminal, and may be one or more SMFs. This is not limited herein.

In a possible implementation, in the step 904, the AMF may invoke an Namf_EventExposure_Notify service to send the identifier of the terminal and the first restricted service policy to the SMF of the terminal. Further, after receiving the identifier of the terminal and the first restricted service policy, the SMF of the terminal may send a service response message to the AMF. The service response message is used to acknowledge reception of the identifier of the terminal and the first restricted service policy that are sent by the AMF.

To simplify the accompanying drawings, FIG. 16 to FIG. 18 show that the AMF sends the identifier of the terminal and the first restricted service policy to only one SMF of the terminal. In addition, for ease of description, the following steps are also described using a procedure as an example in which one SMF of the terminal receives the identifier of the terminal and the first restricted service policy that are sent by the AMF. A procedure in which another SMF of the terminal receives the identifier of the terminal and the first restricted service policy that are sent by the AMF is the same as the following procedure. Details are not described herein again.

Optionally, the method further includes: after receiving the identifier of the terminal and the first restricted service policy, the SMF may deliver, according to the first restricted service policy, a restricted service policy corresponding to a communications device to the communications device, such that the communications device provides a restricted service for the terminal according to the received restricted service policy.

For example, as shown in FIG. 16, when the first restricted service policy is used to stop an uplink data flow of the terminal, the method may include the following step 905a and step 906a. Alternatively, as shown in FIG. 17, when the first restricted service policy is used to stop an uplink data flow of the terminal, the method may include the following step 905b and step 906b.

For example, as shown in FIG. 18, when the first restricted service policy is used to restrict a downlink data flow of the terminal, the method may include the following step 905c and step 906c.

For example, when the first restricted service policy is used to stop an uplink data flow and restrict a downlink data flow of the terminal, the method may include the following step 905*a*, step 905*c*, and step 906*c*, or the method may include the following step 905*b*, step 906*b*, step 905*c*, and step 906*c*.

Further, after receiving the identifier of the terminal and the first restricted service policy, the SMF may alternatively send the identifier of the terminal and the first restricted service policy to a PCF corresponding to the SMF, such that the PCF determines whether to modify the first restricted service policy. If the PCF does not need to modify the first restricted service policy, the PCF may send the identifier of the terminal and the first restricted service policy to the SMF. If the PCF needs to modify the first restricted service policy, the PCF may send a modified restricted service policy to the SMF, such that the SMF delivers, according to the modified restricted service policy, the restricted service policy corresponding to the communications device to the communications device, to provide the restricted service for the terminal. For descriptions of delivering, by the SMF according to the modified restricted service policy, restricted service policies corresponding to different communications devices to the communications devices, refer to related descriptions of delivering, according to the first restricted service policy, the restricted service policy corresponding to the communications device to the communications device. Details are not described herein again.

The following describes the step 905*a* and the step 906*a*.

Step 905*a*: The SMF sends a second restricted service policy to the terminal.

For descriptions of the step 905*a*, refer to related descriptions of the step 405*a* in the method provided in the embodiment shown in FIG. 4. Details are not described herein again.

Step 906*a*: The terminal stops transmission of an uplink data flow according to the second restricted service policy.

For descriptions of the step 906*a*, refer to related descriptions of the step 406*a* in the method provided in the embodiment shown in FIG. 4. Details are not described herein again.

Further, after receiving the second restricted service policy from the SMF, the terminal may further send an acknowledgment message to the SMF. The acknowledgment message is used to acknowledge reception of the second restricted service policy sent by the SMF. For example, the terminal sends an SM NAS ACK message to the SMF using a RAN and an AMF.

The following describes the step 905*b* and the step 906*b*.

Step 905*b*: The SMF sends the identifier of the terminal and a third restricted service policy to an access network device.

For descriptions of the step 905*b*, refer to related descriptions of the step 405*b* in the method provided in the embodiment shown in FIG. 5. Details are not described herein again.

Step 906*b*: The access network device stops an uplink data flow of the terminal based on the identifier of the terminal and the third restricted service policy.

For descriptions of the step 906*b*, refer to related descriptions of the step 406*b* in the method provided in the embodiment shown in FIG. 5. Details are not described herein again.

Further, after receiving the identifier of the terminal and the third restricted service policy from the SMF, the access network device may further send an acknowledgment message to the SMF. The acknowledgment message may be used to acknowledge reception of the identifier of the terminal and the third restricted service policy that are sent by the SMF. For example, the access network device sends an SM NAS ACK message to the SMF using the AMF.

The following describes the step 905*c* and the step 906*c*.

Step 905*c*: The SMF sends the identifier of the terminal and a fourth restricted service policy to a UPF.

For descriptions of the step 905*c*, refer to related descriptions of the step 405*c* in the method provided in the embodiment shown in FIG. 6. Details are not described herein again.

Step 906*c*: The UPF restricts a downlink data flow of the terminal based on the identifier of the terminal and the fourth restricted service policy.

For descriptions of the step 906*c*, refer to related descriptions of the step 406*c* in the method provided in the embodiment shown in FIG. 6. Details are not described herein again.

According to the method provided in the embodiment shown in FIG. 16 to FIG. 18, when determining that the terminal is in a state of exception, the AF determines the first restricted service policy that corresponds to an exception of the terminal and that is used to provide the restricted service for the terminal, and sends the identifier of the terminal and the first restricted service policy to the UDM. As such, the UDM sends the identifier of the terminal and the first restricted service policy to the AMF, the AMF sends the identifier of the terminal and the first restricted service policy to the SMF of the terminal, the SMF sends, according to the first restricted service policy, the restricted service policy corresponding to the communications device to the communications device, and the communications device provides the restricted service for the terminal, instead of directly deregistering the terminal when the terminal is abnormal. This effectively reduces security risks and improves management efficiency of the terminal.

The methods provided in the embodiments of this application are mainly described above from a perspective of interaction between nodes. For same or similar steps or terms mentioned in the embodiments, reference may be made to each other. It may be understood that, to implement the foregoing functions, the nodes such as the NWDAF, the PCF, the AMF, the SMF, the UDM, and other communications device include corresponding hardware structures and/or software modules for implementing the functions. A person of ordinary skill in the art should be aware that, in combination with the examples described in the embodiments disclosed in this specification, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the NWDAF, the PCF, the AMF, the SMF, the UDM, and other communications device may be divided into functional modules according to the foregoing method examples. For example, functional modules may be obtained through division corresponding to the functions. Alternatively, two or more functions may be integrated into one processing module. The integrated module may be implemented in a form of hardware, or may be implemented in a form of a software functional module. It should be noted that, in this embodiment of this application, module division is an example, and is merely a logical function division. In an actual implementation, another division manner may be used.

An embodiment of this application provides a communications device. The communications device may be a PCF, a chip in the PCF, or a system-on-a-chip. The communications device may be configured to perform a function of the PCF in the foregoing embodiments.

Figure 19:
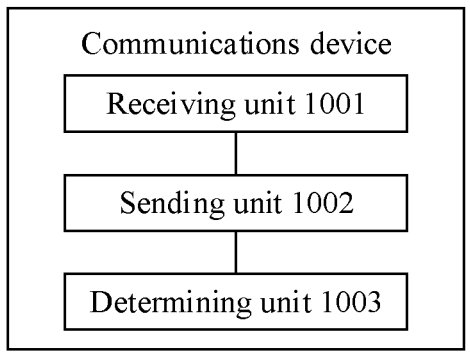
FIG. 19 is a schematic diagram of composition of a communications device according to an embodiment of this application.

In an implementation, as shown in FIG. 19, the communications device may include a receiving unit 1001 and a sending unit 1002.

The receiving unit 1001 is configured to receive an identifier of a terminal and indication information, where the indication information is used to indicate that the terminal is in a state of exception or indicate an exception type of the terminal. For example, the receiving unit 1001 supports the communications device to perform the step 303.

The sending unit 1002 is configured to send the identifier of the terminal and a first restricted service policy according to the indication information received by the receiving unit 1001, where the first restricted service policy is used to provide a restricted service for the terminal. For example, the sending unit 1002 supports the communications device to perform the step 304, the step 404, the step 507, and the step 604.

Further, the sending unit 1002 shown in FIG. 19 may be further configured to support the communications device to perform the step 503.

Further, the communications device shown in FIG. 19 may further include: a determining unit 1003 configured to determine the first restricted service policy according to the indication information. For example, the determining unit 1003 supports the communications device to perform the step 403, the step 506, and the step 603.

It should be noted that, for all related content of the steps in the foregoing method embodiments, refer to function descriptions of the corresponding functional modules. Details are not described herein again. The communications device provided in this embodiment of this application is configured to perform the method for providing a restricted service, and therefore can achieve a same effect as the method for providing a restricted service.

In another implementation, the communications device may include a processing module and a communications module. The processing module is configured to control and manage an action of the communications device. For example, the processing module is configured to support the communications device to perform the step 403, the step 506, the step 603, and other processes of a technology described in the embodiments. The communications module is configured to support the communications device to communicate with another network entity, for example, communicate with a functional module or a network entity shown in FIG. 1. For example, the communications module is configured to support the communications device to perform the step 303, the step 304, the step 404, the step 503, the step 507, the step 604, and other processes of the technology described in the embodiments. Further, the communications device may further include a storage module configured to store program code and data of the communications device.

The processing module may be a processor a controller. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor, and or the like. The communications module may be a transceiver circuit, a communications interface, or the like. The storage module may be a memory. When the processing module is a processor, the communications module is a communications interface, and the storage module is a memory, the communications device may be the communications device shown in FIG. 2.

An embodiment of this application provides another communications device. The communications device may be an SMF, a chip in the SMF, or a system-on-a-chip. The communications device may be configured to perform a function of the SMF in the foregoing embodiments.

Figure 20:
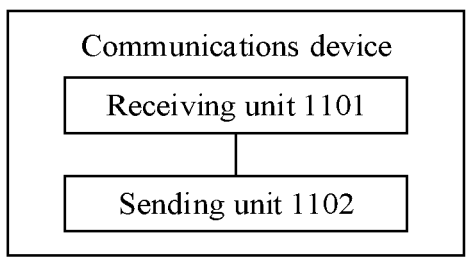
FIG. 20 is a schematic diagram of composition of another communications device according to an embodiment of this application.

In an implementation, as shown in FIG. 20, the communications device may include a receiving unit 1101 and a sending unit 1102.

The receiving unit 1101 is configured to receive an identifier of a terminal and a first restricted service policy. For example, the receiving unit 1101 supports the communications device to perform the step 305 and the step 705.

The sending unit 1102 is configured to send, to the communications device according to the first restricted service policy received by the receiving unit 1101, the restricted service policy corresponding to the communications device. For example, the sending unit 1102 supports the communications device to perform the step 306, the step 405a, the step 405b, the step 405c, the step 508a, the step 508b, the step 508c, the step 706, the step 804a, the step 804b, the step 804c, the step 905a, the step 905b, and the step 905c.

It should be noted that, for all related content of the steps in the foregoing method embodiments, refer to function descriptions of the corresponding functional modules. Details are not described herein again. The communications device provided in this embodiment of this application is configured to perform the method for providing a restricted service, and therefore can achieve a same effect as the method for providing a restricted service.

In another implementation, the communications device may include a processing module and a communications module. The processing module is configured to control and manage an action of the communications device. For example, the processing module is configured to support the communications device to perform other processes of a technology described in the embodiments. The communications module is configured to support the communications device in communicating with another network entity, for example, communicating with a function module or a network entity shown in FIG. 1. For example, the communications module is configured to support the communications device to perform the step 305, the step 306, the step 405a, the step 405b, the step 405c, the step 508a, the step 508b, the step 508c, the step 705, the step 706, the step 804a, the step 804b, the step 804c, the step 905a, the step 905b, the step 905c, and other processes of the technology described in the embodiments. The communications device may further include a storage module configured to store program code and data of the communications device.

The processing module may be a processor a controller. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor, and or the like. The communications module may be a transceiver circuit, a communications interface, or the like. The storage module may be a memory. When the processing module is a processor, the communications module is a communications interface, and the storage module is a memory, the communications device may be the communications device shown in FIG. 2.

An embodiment of this application provides still another communications device. The communications device may be an AMF, a chip in the AMF, or a system-on-a-chip. The communications system may be configured to perform a function of the AMF in the foregoing embodiments.

Figure 21:
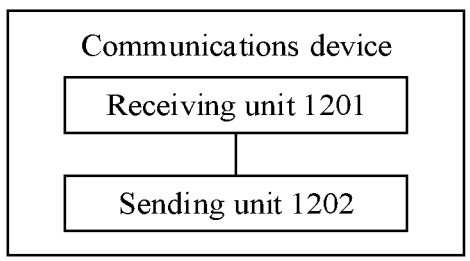
FIG. 21 is a schematic diagram of composition of still another communications device according to an embodiment of this application.

In an implementation, as shown in FIG. 21, the communications device may include a receiving unit 1201 and a sending unit 1202.

The receiving unit 1201 is configured to receive an identifier of a terminal and a first restricted service policy, where the first restricted service policy is used to provide a restricted service for the terminal.

The sending unit 1202 is configured to send, to a communications device according to the first restricted service policy received by the receiving unit 1201, the restricted service policy corresponding to the communications device, to provide the restricted service for the terminal. For example, the sending unit 1202 supports the communications device to perform the step 605a and the step 605b.

Further, the sending unit 1202 may be further configured to support the communications device to perform the step 504 and the step 904.

It should be noted that, for all related content of the steps in the foregoing method embodiments, refer to function descriptions of the corresponding functional modules. Details are not described herein again. The communications device provided in this embodiment of this application is configured to perform the method for providing a restricted service, and therefore can achieve a same effect as the method for providing a restricted service.

In another implementation, the communications device may include a processing module and a communications module. The processing module is configured to control and manage an action of the communications device. The communications module is configured to support the communications device to communicate with another network entity, for example, communicate with a functional module or a network entity shown in FIG. 1. For example, the communications module is configured to support the communications device to perform the step 504, the step 605a, the step 605b, the step 904, and other processes of the technology described in the embodiments. The communications device may further include a storage module configured to store program code and data of the communications device.

The processing module may be a processor a controller. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor, and or the like. The communications module may be a transceiver circuit, a communications interface, or the like. The storage module may be a memory. When the processing module is a processor, the communications module is a communications interface, and the storage module is a memory, the communications device may be the communications device shown in FIG. 2.

An embodiment of this application provides still another communications device. The communications device may be a first network element, a chip in the first network element, or a system-on-a-chip. The communications system may be configured to perform a function of the first network element in the foregoing embodiments. The first network element may be an NWDAF or an AF.

Figure 22:
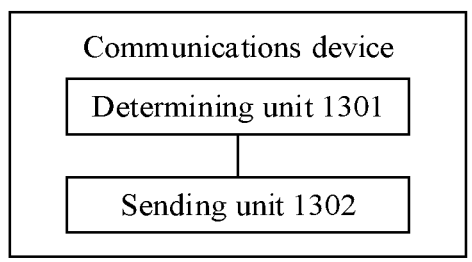
FIG. 22 is a schematic diagram of composition of still another communications device according to an embodiment of this application.

In an implementation, as shown in FIG. 22, the communications device may include a determining unit 1301 and a sending unit 1302.

The determining unit 1301 is configured to determine that a terminal is in a state of exception. For example, the determining unit 1301 supports the communications device to perform the step 301, the step 401, the step 501, and the step 601.

The sending unit 1302 is configured to send an identifier of the terminal and indication information to a PCF, where the indication information is used to indicate that the terminal is in the state of exception or indicate an exception type of the terminal. For example, the sending unit 1002 supports the communications device to perform the step 302, the step 402, the step 502, and the step 602.

It should be noted that, for all related content of the steps in the foregoing method embodiments, refer to function descriptions of the corresponding functional modules. Details are not described herein again. The communications device provided in this embodiment of this application is configured to perform the method for providing a restricted service, and therefore can achieve a same effect as the method for providing a restricted service.

In another implementation, the communications device may include a processing module and a communications module. The processing module is configured to control and manage an action of the communications device. For example, the processing module is configured to support the communications device to perform the step 301, the step 401, the step 501, the step 601, and other processes of a technology described in the embodiments. The communications module is configured to support the communications device to communicate with another network entity, for example, communicate with a functional module or a network entity shown in FIG. 1. For example, the communications module is configured to support the communications device to perform the step 302, the step 402, the step 502, the step 602, and other processes of the technology described in the embodiments. The communications device may further include a storage module configured to store program code and data of the communications device.

The processing module may be a processor a controller. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor, and or the like. The communications module may be a transceiver circuit, a communications interface, or the like. The storage module may be a memory. When the processing module is a processor, the communications module is a communications interface, and the storage module is a memory, the communications device may be the communications device shown in FIG. 2.

An embodiment of this application provides still another communications device. The communications device may be a UDM, a chip in the UDM, or a system-on-a-chip. The communications system may be configured to perform a function of the UDM in the foregoing embodiments.

Figure 23:
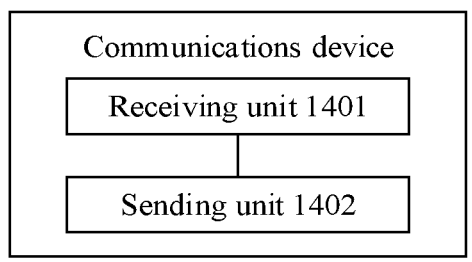
FIG. 23 is a schematic diagram of composition of still another communications device according to an embodiment of this application.

In an implementation, as shown in FIG. 23, the communications device may include a receiving unit 1401 and a sending unit 1402.

The receiving unit 1401 is configured to receive an identifier of a terminal and a first restricted service policy, where the first restricted service policy is used to provide a restricted service for the terminal. For example, the receiving unit 1401 supports the communications device to perform the step 703.

The sending unit 1402 is configured to send the identifier of the terminal and the first restricted service policy. For example, the determining unit 1003 supports the communications device to perform the step 704, the step 803, and the step 903.

It should be noted that, for all related content of the steps in the foregoing method embodiments, refer to function descriptions of the corresponding functional modules. Details are not described herein again. The communications device provided in this embodiment of this application is configured to perform the method for providing a restricted service, and therefore can achieve a same effect as the method for providing a restricted service.

In another implementation, the communications device may include a processing module and a communications module. The processing module is configured to control and manage an action of the communications device. The communications module is configured to support the communications device to communicate with another network entity, for example, communicate with a functional module or a network entity shown in FIG. 1. For example, the communications module is configured to support the communications device to perform the step 703, the step 704, the step 803, the step 903, and other processes of the technology described in the embodiments. The communications device may further include a storage module configured to store program code and data of the communications device.

The processing module may be a processor a controller. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor, and or the like. The communications module may be a transceiver circuit, a communications interface, or the like. The storage module may be a memory. When the processing module is a processor, the communications module is a communications interface, and the storage module is a memory, the communications device may be the communications device shown in FIG. 2.

An embodiment of this application provides still another communications device. The communications device may be an AF, a chip in the AF, or a system-on-a-chip. The communications system may be configured to perform a function of the AF in the foregoing embodiments.

Figure 24:
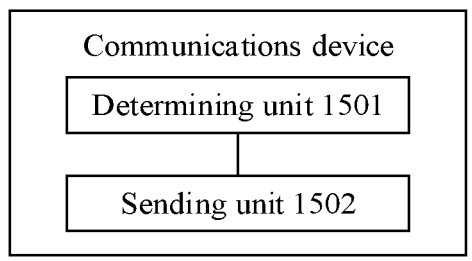
FIG. 24 is a schematic diagram of composition of still another communications device according to an embodiment of this application.

In an implementation, as shown in FIG. 24, the communications device may include a determining unit 1501 and a sending unit 1502.

The determining unit 1501 is configured to determine that a terminal is in a state of exception and a restricted service policy corresponding to an exception, where the restricted service policy corresponding to the exception is used to provide a restricted service for the terminal. For example, the determining unit 1501 supports the communications device to perform the step 701, the step 801, and the step 901.

The sending unit 1502 is configured to send an identifier of the terminal and the restricted service policy that corresponds to the exception and that is determined by the determining unit 1501. For example, the sending unit 1502 supports the communications device to perform the step 702, the step 802, and the step 902.

It should be noted that, for all related content of the steps in the foregoing method embodiments, refer to function descriptions of the corresponding functional modules. Details are not described herein again. The communications device provided in this embodiment of this application is configured to perform the method for providing a restricted service, and therefore can achieve a same effect as the method for providing a restricted service.

In another implementation, the communications device may include a processing module and a communications module. The processing module is configured to control and manage an action of the communications device. For example, the processing module is configured to support the communications device to perform the step 701, the step 801, the step 901, and other processes of a technology described in the embodiments. The communications module is configured to support the communications device to communicate with another network entity, for example, communicate with a functional module or a network entity shown in FIG. 1. For example, the communications module is configured to support the communications device to perform the step 702, the step 802, the step 902, and other processes of the technology described in the embodiments. The communications device may further include a storage module configured to store program code and data of the communications device.

The processing module may be a processor a controller. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor, and or the like. The communications module may be a transceiver circuit, a communications interface, or the like. The storage module may be a memory. When the processing module is a processor, the communications module is a communications interface, and the storage module is a memory, the communications device may be the communications device shown in FIG. 2.

An embodiment of this application provides a communications system. The communications system may include the communications device (the communications device may be a PCF) shown in FIG. 19, the communications device (the communications device may be an SMF) shown in FIG. 20, the communications device (the communications device may be a first network element, and the first network element may be an NWDAF or an AF) shown in FIG. 22, a terminal, an access network device, and a UPF.

The foregoing devices may collaborate with each other to implement the method for providing a restricted service provided in the embodiments of this application, for example, the method provided in any of the embodiments shown in FIG. 3 to FIG. 6.

Further, the communications system may further include the communications device (the communications device may be an AMF) shown in FIG. 21. The communications device shown in FIG. 21 and the foregoing devices collaborate with each other to implement the method for providing a restricted service provided in the embodiments of this application. For example, the method provided in any of the embodiments shown in FIG. 7 to FIG. 11.

An embodiment of this application provides another communications system. The communications system may include the communications device (the communications device may be an SMF) shown in FIG. 20, the communications device (the communications device may be a UDM) shown in FIG. 23, the communications device (the communications device may be an AF) shown in FIG. 24, a terminal, an access network device, and a UPF.

The foregoing devices may collaborate with each other to implement the method for providing a restricted service provided in the embodiments of this application, for example, the method provided in any embodiment shown in FIG. 12 to FIG. 15.

Further, the communications system may further include the communications device (the communications device may be an AMF) shown in FIG. 21. The communications device shown in FIG. 21 and the foregoing devices collaborate with each other to implement the method for providing a restricted service provided in the embodiments of this application. For example, the method provided in any of the embodiments shown in FIG. 16 to FIG. 18.

The foregoing descriptions about implementations allow a person skilled in the art to understand that, for ease of description and brevity, division of the foregoing functional modules is used as an example for illustration. In an actual application, the foregoing functions may be allocated to different functional modules and implemented as required, in other words, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into the modules or units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to other approaches, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of this application. The foregoing storage medium includes: any medium that can store program code, such as a Universal Serial Bus (USB) flash drive, a removable hard disk, a ROM, a RAM, a magnetic disk, or an optical disc.

The foregoing descriptions are merely example implementations of this application, but are not intended to restrict the protection scope of this application. Any variation or replacement within the technical scope disclosed in this application shall fall within the protection scope of this application. Therefore, the protection scope of this application shall be subject to the protection scope of the claims.

The invention claimed is:

1. A system, comprising:
a policy control function (PCF) configured to:
receive an identifier of a terminal and indication information, wherein the indication information indicates an exception type of the terminal, and wherein the exception type comprises that performance of a flow of the terminal is abnormal;
determine a first service policy corresponding to the exception type; and
send the first service policy; and
a network data analytics function (NWDAF) configured to:
determine the exception type; and
send, to the PCF, the identifier and the indication information.

2. The system of claim 1, wherein the first service policy comprises:
stopping a data flow; or
restricting the data flow.

3. The system of claim 1, wherein the first service policy comprises:
stopping an uplink data flow;
restricting a downlink data flow; or
stopping the uplink data flow and restricting the downlink data flow.

4. The system of claim 1, wherein the NWDAF is further configured to determine the exception type by determining, based on traffic information of the terminal, the exception type of the terminal, and wherein the traffic information comprises uplink traffic information or downlink traffic information.

5. The system of claim 1, wherein the performance of the flow of the terminal is abnormal comprises:
abnormal uplink traffic;
abnormal downlink traffic; or
the abnormal uplink traffic and the abnormal downlink traffic.

6. The system of claim 1, wherein the system further comprises a session management function (SMF), and wherein the SMF is configured to receive the first service policy.

7. The system of claim 1, wherein that the performance of the flow of the terminal is abnormal comprises a rate of the flow is abnormal.

8. A method, comprising:
receiving, by a policy control function (PCF) and from a network data analytics function (NWDAF), an identifier of a terminal and indication information, wherein the indication information indicates an exception type of the terminal, and wherein the exception type comprises that performance of a flow of the terminal is abnormal;
determining, by the PCF, a first service policy corresponding to the exception type;
sending, by the PCF, the first service policy;
determining, by the NWDAF, the exception type; and sending, by the NWDAF to the PCF, the identifier and the indication information.

9. The method of claim 8, wherein the first service policy comprises:
stopping a data flow; or
restricting the data flow.

10. The method of claim 8, wherein the first service policy comprises:
stopping an uplink data flow;
restricting a downlink data flow; or
stopping the uplink data flow and restricting the downlink data flow.

11. The method of claim 8, wherein determining, by the NWDAF, the exception type comprises determining, by the NWDAF and based on traffic information of the terminal, the exception type of the terminal, and wherein the traffic information comprises uplink traffic information or downlink traffic information.

12. The method of claim 8, wherein the performance of the flow of the terminal is abnormal comprises:
abnormal uplink traffic;
abnormal downlink traffic; or
the abnormal uplink traffic and the abnormal downlink traffic.

13. The method of claim 8, wherein that the performance of the flow is abnormal comprises a rate of the flow is abnormal.

14. The method of claim 8, wherein sending, by the PCF, the first service policy comprises sending, by the PCF, the first service policy to a session management function (SMF), and wherein the method further comprises receiving, by the SMF, the first service policy.

15. A computer program product comprising instructions stored on a non-transitory computer-readable medium that, when executed by one or more processors, cause an apparatus to:
receive, from a data network data analytics function (NWDAF), an identifier of a terminal and indication information, wherein the indication information indicates an exception type of the terminal, and wherein the exception type comprises that performance of a flow of the terminal is abnormal;
determine a first service policy corresponding to the exception type; and
send, to a session management function (SMF), the first service policy.

16. The computer program product of claim 15, wherein the one or more processors are further configured to execute the instructions to cause the apparatus to:
stop a data flow; or
restrict the data flow.

17. The computer program product of claim 15, wherein the first service policy comprises:
stopping an uplink data flow;
restricting a downlink data flow; or
stopping the uplink data flow and restricting the downlink data flow.

18. The computer program product of claim 15, wherein the exception type of the terminal is determined based on traffic information of the terminal, and wherein the traffic information comprises uplink traffic information or downlink traffic information.

19. The computer program product of claim 15, wherein the performance of the flow of the terminal is abnormal comprises:
abnormal uplink traffic;
abnormal downlink traffic; or
the abnormal uplink traffic and the abnormal downlink traffic.

20. The computer program product of claim 15, wherein that the performance of the flow of the terminal is abnormal comprises a rate of the flow is abnormal.

* * * * *